(12) United States Patent
Kanno et al.

(10) Patent No.: US 12,730,390 B2
(45) Date of Patent: Sep. 8, 2026

(54) FINE PARTICLE, EXTERNAL ADDITIVE FOR TONERS, AND TONER

(71) Applicant: CANON KABUSHIKI KAISHA, Tokyo (JP)

(72) Inventors: Ichiro Kanno, Chiba (JP); Hiroki Watanabe, Chiba (JP); Mari Kaburagi, Chiba (JP); Hayato Ida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 450 days.

(21) Appl. No.: 18/366,958

(22) Filed: Aug. 8, 2023

(65) Prior Publication Data

US 2024/0061356 A1 Feb. 22, 2024

(30) Foreign Application Priority Data

Aug. 15, 2022 (JP) ................................. 2022-129412

(51) Int. Cl.

| | |
|---|---|
| ***G03G 9/097*** | (2006.01) |
| ***C01B 33/02*** | (2006.01) |
| ***G03G 9/08*** | (2006.01) |

(52) U.S. Cl.

CPC ......... *G03G 9/09725* (2013.01); *C01B 33/02* (2013.01); *G03G 9/0819* (2013.01); *G03G 9/0821* (2013.01); *G03G 9/09716* (2013.01); *C01P 2004/62* (2013.01)

(58) Field of Classification Search

CPC ............. G03G 9/09725; G03G 9/0819; G03G 9/0821; G03G 9/09716; C01B 33/02; C01P 2004/62

See application file for complete search history.

(56) References Cited

U.S. PATENT DOCUMENTS

| | | | |
|---|---|---|---|
| 9,057,970 | B2 | 6/2015 | Ida |
| 9,152,088 | B1 | 10/2015 | Kobori |
| 9,348,247 | B2 | 5/2016 | Ida |
| 9,348,253 | B2 | 5/2016 | Kanno |
| 9,417,540 | B2 | 8/2016 | Hashimoto |
| 9,436,112 | B2 | 9/2016 | Iwasaki |
| 9,540,483 | B2 | 1/2017 | Ida |

(Continued)

FOREIGN PATENT DOCUMENTS

| | | | |
|---|---|---|---|
| JP | H11130861 | A | 5/1999 |
| JP | 2000-143807 | A | 5/2000 |

(Continued)

OTHER PUBLICATIONS

U.S. Appl. No. 18/334,709, filed Jun. 14, 2023, Kouichirou Ochi.

*Primary Examiner* — Mark F. Huff

*Assistant Examiner* — Boone Alexander Evans

(74) *Attorney, Agent, or Firm* — VENABLE LLP

(57) ABSTRACT

The fine particle is a silicon-containing fine particle, wherein the number-average diameter of the fine particle is 0.05 μm to 0.30 μm; the proportion of the silicon atom with reference to the total of the elements is at least 20% according to fluorescent x-ray measurement of the fine particle; and, with respect to the silicon atom proportions measured in analysis by x-ray photoelectron spectroscopy while irradiating with Ar-Kα radiation and etching, the proportions of silicon atoms having prescribed structures vary at prescribed depths.

9 Claims, 1 Drawing Sheet

(56) References Cited

U.S. PATENT DOCUMENTS 9,651,883 B2 5/2017 Hama
9,665,026 B2 5/2017 Iwasaki
9,696,644 B2 7/2017 Ida
9,809,682 B2 * 11/2017 Ishizu ................ G03G 9/09725
9,897,934 B2 2/2018 Tamura
10,012,920 B2 7/2018 Shibata
10,036,970 B2 7/2018 Kanno
10,078,281 B2 9/2018 Ida
10,082,743 B2 9/2018 Hama
10,088,765 B2 10/2018 Miyakai
10,146,146 B2 12/2018 Komatsu
10,175,595 B2 1/2019 Onozaki
10,197,936 B2 2/2019 Onozaki
10,203,619 B2 2/2019 Yamashita
10,228,629 B2 3/2019 Tamura
10,274,851 B2 4/2019 Hashimoto
10,353,312 B2 7/2019 Kamae
10,401,748 B2 9/2019 Hashimoto
10,423,086 B2 9/2019 Hama
10,451,985 B2 10/2019 Takahashi
10,451,986 B2 10/2019 Sano
10,451,990 B2 10/2019 Kamae
10,474,049 B2 11/2019 Onozaki
10,514,624 B2 12/2019 Tamura
10,551,759 B2 2/2020 Watanabe
10,564,560 B2 2/2020 Onozaki
10,599,060 B2 3/2020 Kanno
10,656,545 B2 5/2020 Kamae
10,747,132 B2 8/2020 Takahashi
10,768,543 B2 9/2020 Tsujimoto
10,775,710 B1 9/2020 Kamae
10,859,931 B2 12/2020 Hashimoto
10,877,386 B2 12/2020 Murayama
10,935,902 B2 3/2021 Kanno
10,955,765 B2 3/2021 Onozaki
10,969,705 B2 4/2021 Shirayama
11,029,617 B2 6/2021 Chimoto
11,131,939 B2 9/2021 Hama
11,181,848 B2 11/2021 Ochi
11,249,410 B2 2/2022 Takahashi
11,624,986 B2 4/2023 Kanno
11,662,670 B2 5/2023 Hama
11,675,283 B2 6/2023 Kamae
11,714,362 B2 8/2023 Kanno
2001/0039322 A1 11/2001 Hattori
2011/0223534 A1 9/2011 Shibata et al.
2013/0137029 A1 5/2013 Kadonome et al.
2016/0319077 A1 11/2016 Ishizu
2018/0329332 A1 * 11/2018 Tominaga .......... G03G 9/09725
2021/0181647 A1 6/2021 Hashimoto
2021/0278774 A1 9/2021 Hashimoto
2021/0278775 A1 9/2021 Kamae
2022/0187728 A1 6/2022 Miura
2022/0197163 A1 6/2022 Kajihara
2022/0197166 A1 6/2022 Chimoto
2022/0197174 A1 6/2022 Kajihara
2022/0236654 A1 7/2022 Watanabe
2022/0236655 A1 7/2022 Kanno
2022/0236656 A1 7/2022 Kanno
2022/0252995 A1 8/2022 Tsujimoto
2022/0299901 A1 9/2022 Murata
2022/0299902 A1 9/2022 Abe
2022/0326630 A1 10/2022 Hashimoto
2022/0342335 A1 10/2022 Ochi
2022/0404727 A1 12/2022 Ueda
2022/0413406 A1 12/2022 Shino
2023/0086689 A1 3/2023 Kanno
2023/0152725 A1 5/2023 Ochi
2023/0305419 A1 9/2023 Watanabe
2023/0314972 A1 10/2023 Hashimoto

FOREIGN PATENT DOCUMENTS

JP 2007-99582 A 4/2007
JP 2010-235951 A 10/2010
JP 2011-206762 A 10/2011
JP 2013-137508 A 7/2013
JP 2014-5363 A 1/2014
JP 2018-4949 A 1/2018
JP 2020-86076 A 6/2020
JP 2022-113640 A 8/2022
JP 2022-113643 A 8/2022
WO 2015/107961 A1 7/2015

* cited by examiner

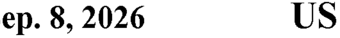
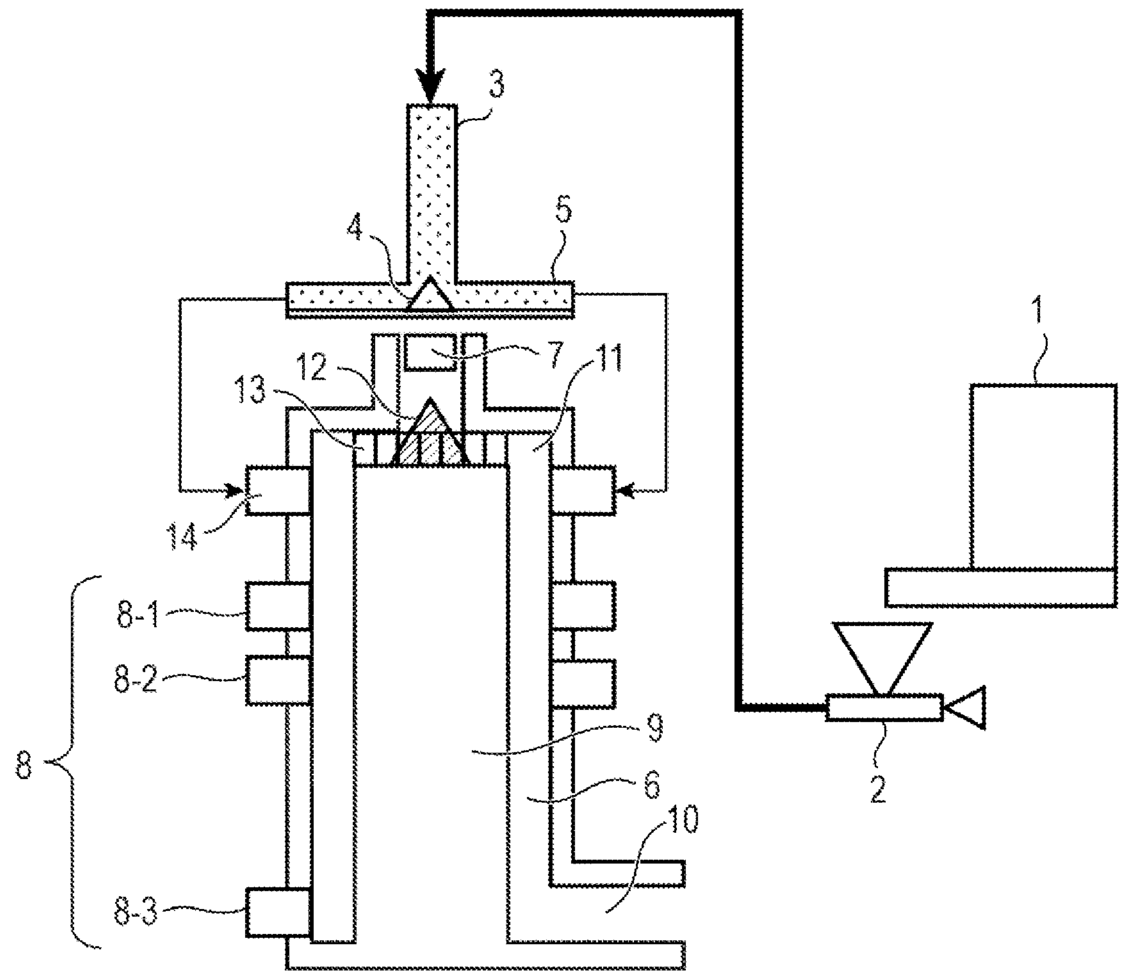
3
4
5
1
7
11
12
13
14
8-1
8-2
8
9
6
10
8-3
2

FINE PARTICLE, EXTERNAL ADDITIVE FOR TONERS, AND TONER

BACKGROUND OF THE INVENTION

Field of the Invention

The present disclosure relates to a fine particle, to an external additive for the toners used in electrophotographic systems, and to a toner.

Description of the Related Art

Accompanying the widespread dissemination in recent years of electrophotographic system-based full-color copiers, there have also been additional increases in the requirements on electrophotographic toners with regard to longer life and the ability to accommodate higher printing speeds. The use of silica as an external additive for toners is generally widely known to date.

For example, Japanese Patent Application Laid-open No. 2007-099582 provides an example in which the charge stability of toner is improved by the addition, to a toner base particle, of highly hydrophobic spherical sol-gel silica fine particles.

On the other hand, there are examples in WO 2015/107961 and Japanese Patent Application Laid-open No. 2018-004949 of improving the flowability and environmental stability of toners through the addition to the toner particle of a polyalkylsilsesquioxane fine particle.

SUMMARY OF THE INVENTION

With toner to which a silica particle has been externally added, as described in Japanese Patent Application Laid-open No. 2007-099582, the silica particle ultimately becomes embedded or buried in the toner particle surface when in an environment in which stress is applied through frequent contact by the toner with a member such as a carrier, e.g., in the case of the extended output of a low print density image. Due to this, the surface state of the toner undergoes a substantial change, and there is room for improvement from a transferability standpoint via a reduction in the attachment force of the toner.

On the other hand, a polyalkylsilsesquioxane fine particle exhibits a lower hardness than inorganic external additives such as silica, and as a consequence there is little difference between the hardness of the toner particle surface and the hardness of the external additive and a circumstance is created wherein embedding of the external additive in the toner particle surface due to an extended print run is suppressed. Because of this ability to suppress particle embedding, toner to which a polyalkylsilsesquioxane fine particle has been externally added can maintain an excellent developing performance, transferability, and flowability throughout an extended print run.

However, it has been found that there is a problem with the blade cleaning performance for the photosensitive member surface when a polyalkylsilsesquioxane fine particle is used. Because a polyalkylsilsesquioxane fine particle has a low hardness, it is thought that the polyalkylsilsesquioxane fine particle undergoes deformation at the cleaning blade nip region and ends up passing through.

The present disclosure relates to a fine particle that, when used as an external additive for toners, provides an excellent blade cleaning behavior, exhibits an excellent stability during durability testing, and over the long term is stable and makes it possible to obtain high-equality images. The present disclosure also relates to an external additive for toners that has this fine particle and to a toner.

The present disclosure relates to a fine particle containing silicon, wherein:

the number-average primary particle diameter of the fine particle is 0.05 to 0.30 μm;

the proportion of a silicon atom with reference to a total of elements is at least 20% according to fluorescent x-ray measurement of the fine particle; and with respect to the silicon atom proportions measured in analysis by x-ray photoelectron spectroscopy while irradiating with Ar-Kα radiation and etching, and using a total detected silicon atom peak area for total peak area of the silicon atom at a binding energy of 102.0 eV to 104.0 eV, using X for a proportion (atomic %), in the total detected silicon atom peak area, of a peak area at a binding energy of 103.5 eV to 104.0 eV, which corresponds to silicon atom having a structure given by following formula (a), and using Y for sum of proportions (atomic %), in the total detected silicon atom peak area, of peak areas at a binding energy of 102.0 eV to 103.4 eV, which correspond to silicon atoms having a structure given by following formula (b), a structure given by following formula (c), and a structure given by following formula (d), (i) relationship $Y<X$ is constantly satisfied in Condition A measurement range described below, and (ii) in Condition B measurement range described below, a point of transition from $Y<X$ to $Y>X$ is present and $Y>X$ is constantly satisfied after the transition.

Condition A: for a polyethylene terephthalate test specimen, time for which a starting point is time required to erode a depth of 2 nm by irradiation with Ar-Kα radiation and for which an end point is time required to erode a depth of 10 nm.

Condition B: for a polyethylene terephthalate test specimen, time for which a starting point is time required to erode a depth of 10 nm by irradiation with Ar-Kα radiation and for which an end point is time required to erode a depth of 20 nm;

(a)

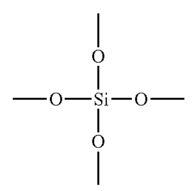

(b)

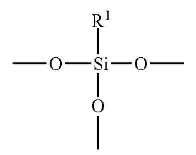

(c)

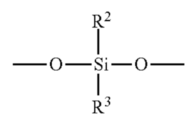

-continued (d)

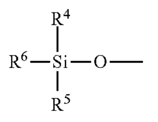

where, $R^1$, $R^2$, $R^3$, $R^4$, $R^5$, and $R^6$ in formulas (a) to (d) each independently represent an alkyl group or a phenyl group.

The present disclosure relates to a toner comprising a toner particle and a fine particle, wherein the fine particle is the above fine particle.

The present disclosure can provide a fine particle that, when used as an external additive for toners, provides an excellent blade cleaning behavior, exhibits an excellent stability during durability testing, and over the long term is stable and makes it possible to obtain high-equality images, and a toner comprising the fine particle.

Further features of the present invention will become apparent from the following description of exemplary embodiments with reference to the attached drawings.

BRIEF DESCRIPTION OF THE DRAWINGS

The FIGURE is an explanatory diagram of a heat treatment apparatus.

DESCRIPTION OF THE EMBODIMENTS

In the present disclosure, the notations "from XX to YY" and "XX to YY" representing a numerical value range denote, unless otherwise stated, a numerical value range that includes the lower limit and the upper limit thereof, as endpoints. In a case where numerical value ranges are described in stages, the upper limits and the lower limits of the respective numerical value ranges can be combined arbitrarily. The present inventors hypothesize the following with regard to the mechanisms by which the aforementioned effects are generated.

The typical silica particle heretofore used as an external additive for toners has been a particle in which the siloxane bond is the main component and has had a high hardness. As a consequence, this silica particle ultimately becomes embedded or buried in the toner particle surface when in an environment in which stress is applied through frequent contact by the toner with a member such as a carrier, e.g., in the case of extended output of a low print density image. As a result, the surface state of the toner undergoes a substantial change, and there is room for improvement from a transferability standpoint via a reduction in the attachment force of the toner.

Conventional polyalkylsilsesquioxane particles, on the other hand, have a low hardness, and embedding into the toner particle surface can then be suppressed even when stress is received from a member, such as a carrier, in the developing device. However, pass through ends up occurring because the polyalkylsilsesquioxane particle undergoes deformation in the cleaning nip region at the photosensitive member surface, and this remains present on the surface of the photosensitive member and can then affect the output image.

As a result of intensive investigations, the present inventors discovered that the aforementioned problem can be solved by optimizing the structure of the surface layer of the fine particle and the structure of the interior of the fine particle. While the mechanism for this is unclear, the present inventors think as follows.

It is thought that, by introducing a substantial amount of siloxane bond in the vicinity of the fine particle surface (region at a depth of 2 to 10 nm), the hardness of the fine particle surface can be increased, deformation of the fine particle in the cleaning nip region at the surface of the photosensitive member can be suppressed, and the amount of pass through can then be reduced. It is further hypothesized that, by providing a suitable flexibility by introducing a substantial amount of alkyl or phenyl groups in the more interior region (region deeper than 10 nm) from the vicinity of the fine particle surface, external stresses can be relaxed and the stability of the toner during durability testing can then be improved. This is considered in greater detail in the following.

The Fine Particle

The present disclosure relates to a fine particle containing silicon, wherein:

- the number-average primary particle diameter of the fine particle is 0.05 to 0.30 μm;
- the proportion of a silicon atom with reference to a total of elements is at least 20% according to fluorescent x-ray measurement of the fine particle; and
- with respect to the silicon atom proportions measured in analysis by x-ray photoelectron spectroscopy while irradiating with Ar-Kα radiation and etching, and
- using a total detected silicon atom peak area for total peak area of the silicon atom at a binding energy of 102.0 eV to 104.0 eV,
- using X for a proportion (atomic %), in the total detected silicon atom peak area, of a peak area at a binding energy of 103.5 eV to 104.0 eV, which corresponds to silicon atom having a structure given by following formula (a), and
- using Y for sum of proportions (atomic %), in the total detected silicon atom peak area, of peak areas at a binding energy of 102.0 eV to 103.4 eV, which correspond to silicon atoms having a structure given by following formula (b), a structure given by following formula (c), and a structure given by following formula (d),
- (i) relationship $Y<X$ is constantly satisfied in Condition A measurement range described below, and
- (ii) in Condition B measurement range described below, a point of transition from $Y<X$ to $Y>X$ is present and $Y>X$ is constantly satisfied after the transition. Condition A: for a polyethylene terephthalate test specimen, time for which a starting point is time required to erode a depth of 2 nm by irradiation with Ar-Kα radiation and for which an end point is time required to erode a depth of 10 nm.

Condition B: for a polyethylene terephthalate test specimen, time for which a starting point is time required to erode a depth of 10 nm by irradiation with Ar-Kα radiation and for which an end point is time required to erode a depth of 20 nm;

(a)

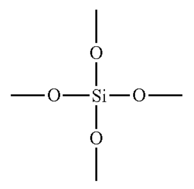

-continued (b)

(c)

(d)

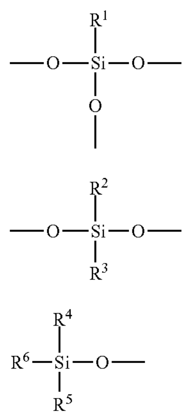

where, $R^1$, $R^2$, $R^3$, $R^4$, $R^5$, and $R^6$ in formulas (a) to (d) each independently represent an alkyl group or a phenyl group. The alkyl group preferably has 1 to 6 carbon atoms, more preferably 1 to 3 carbon atoms, still more preferably 1 or 2 carbon atoms.

According to the present disclosure, the silicon atom proportions measured in analysis of the fine particle by x-ray photoelectron spectroscopy while irradiating with Ar-K$\alpha$ radiation and etching are identified. The total peak area for the silicon atom at a binding energy of 102.0 eV to 104.0 eV is defined as the total detected silicon atom peak area. X is defined as the proportion (atomic %), in the total detected silicon atom peak area, for the peak area at a binding energy of 103.5 eV to 104.0 eV, which corresponds to silicon atom having the structure given by formula (a). Y is defined as the sum of the proportions (atomic %), in the total detected silicon atom peak area, for the peak areas at a binding energy of 102.0 eV to 103.4 eV, which correspond to silicon atoms having the structure given by formula (b), the structure given by formula (c), and the structure given by formula (d).

Using these definitions, the relationship $Y<X$ is constantly satisfied in the condition A measurement range. In addition, in the condition B measurement range, a point of transition from $Y<X$ to $Y>X$ is present and $Y>X$ is constantly satisfied after the transition.

When X and Y do not constantly satisfy the relationship $Y<X$ during the condition A measurement range, this means that there is scarce siloxane bond in the vicinity of the fine particle surface. The hardness of the fine particle surface is then too low, and as a consequence the cleaning performance-improving effect cannot be obtained.

When, in the condition B measurement range, a point is not present at which X and Y transition from $Y<X$ to $Y>X$, or when such a transition point is present but after the transition the relationship $Y>X$ is not constantly satisfied, this means that, in the region inwards from the vicinity of the fine particle surface, the siloxane bond is present to excess and highly flexible structures are scarce. As a consequence, the fine particle then becomes excessively hard and the fine particle ends up being embedded or buried in the toner particle by the stresses that the toner receives from members. A high equality image is not obtained as a result.

The relationship between X and Y can be controlled in wet production methods through the hydrolysis and condensation conditions (reaction temperature, reaction time, stirring time), pH, and type of catalyst during the reaction, and also by the ratio for, and the sequence of addition of, the added monomers.

For example, in order to constantly provide $Y<X$ in the condition A measurement range, a method can be used wherein a large mixing ratio is used for the tetrafunctional silane monomer that will form the structure given by the aforementioned formula (a) (also referred to as the structure (a) in the following). Other methods are, for example, to subsequently gradually add the tetrafunctional silane monomer that will form the structure (a), to provide a high pH for the solution, and so forth.

By proceeding in this manner, the hardness in the region at a depth of 2 to 10 nm from the fine particle surface can be increased, deformation of the fine particle in the cleaning nip region at the photosensitive member surface can be suppressed, and the amount of pass through can then be reduced. Moreover, the prior art, for example, surface treatment with a tetrafunctional monomer that will form the structure (a), is unsatisfactory or inadequate for raising the hardness in the region at a depth of 2 to 10 nm from the fine particle surface and thus cannot provide the indicated effect.

Methods for establishing Y constantly greater than X in the condition B measurement range, on the other hand, can be exemplified by providing a large mixing ratio for the monomers that form the structures with formulas (b) to (d) (preferably the difunctional silane monomer that forms the structure with formula (c)), by establishing a high temperature for the hydrolysis step, and so forth. By proceeding in this manner, the interior of the fine particle will assume a suitable flexibility, and as a result external stresses can be relaxed and the stability of the toner during durability testing can be improved.

The method for producing the fine particle is not particularly limited, but particle formation via the hydrolysis and condensation polymerization reactions of silicon compounds (silane monomer) using the sol-gel method is preferred. Specifically preferred is fine particle formation by bringing about polymerization through the hydrolysis and condensation polymerization reactions of a mixture of difunctional silane having two siloxane bonds with tetrafunctional silane having four siloxane bonds. The silane monomer, e.g., difunctional silane and tetrafunctional silane, is described below.

That is, the fine particle is preferably the condensation polymer of at least one silicon compound selected from the group consisting of difunctional silanes and at least one silicon compound selected from the group consisting of tetrafunctional silanes.

The proportion of the difunctional silane is preferably from 20 mol % to 70 mol %, more preferably from 30 mol % to 60 mol %, and still more preferably from 40 mol % to 60 mol %. The proportion of the tetrafunctional silane is preferably from 30 mol % to 80 mol % and is more preferably from 40 mol % to 70 mol %. The fine particle preferably has a fine particle of a siloxane bond-containing silicon polymer. The silicon polymer fine particle preferably contains at least 90 mass % silicon polymer and more preferably at least 95 mass % silicon polymer.

The method for producing the silicon polymer fine particle is not particularly limited. For example, the fine particle can be obtained by the dropwise addition of the silane compound into water with execution of hydrolysis and condensation reactions in the presence of a catalyst, followed by filtration of the resulting suspension and drying. The particle diameter can be controlled through, for example, the type of catalyst, the blending ratios, the temperature at the start of the reaction, and the duration of dropwise addition. The catalyst can be exemplified by acidic catalysts such as hydrochloric acid, hydrofluoric acid, sulfuric acid, and nitric acid, and by basic catalysts such as aqueous ammonia, sodium hydroxide, and potassium hydroxide, but is not limited to these.

The fine particle is preferably produced by the following method.

This specifically comprises:

a first step of obtaining a hydrolyzate of a silicon compound;

a second step of mixing this hydrolyzate with an alkaline aqueous medium to provide a polycondensation reaction solution, and carrying out a polycondensation reaction on the hydrolyzate to obtain a polycondensation reaction product; and a third step of mixing the polycondensation reaction product with an aqueous solution and carrying out conversion to fine particles. Depending on the circumstances, a hydrophobic agent may additionally be blended into the silicon polymer fine particle dispersion to obtain a hydrophobed spherical silicon polymer fine particle.

In the first step, silicon compound hydrolysis is carried out by bringing the silicon compound and a catalyst into contact, by a method such as, for example, stirring and mixing, in an aqueous solution prepared by the dissolution in water of an acidic or alkaline substance that will act as the catalyst.

The silicon compound in the first step preferably contains monomer that will form a structure with formula (b) to (d), more preferably contains difunctional silane monomer that will form the structure with formula (c), and still more preferably is difunctional silane monomer. The use of said compounds facilitates control of X and Y. In particular, Y constantly greater than X after the transition is easily achieved in the condition B measurement range.

As the catalyst, a known catalyst can be preferably used. Specifically, examples of suitable acidic catalysts include acetic acid, hydrochloric acid, hydrofluoric acid, sulfuric acid, nitric acid, and the like, and examples of suitable basic catalysts include aqueous ammonia, sodium hydroxide, potassium hydroxide, and the like.

The amount of the catalyst used may be adjusted, as appropriate, depending on the silicon compound and the type of catalyst. Preferably, the amount of the catalyst used is selected in the range of from $1\times10^{-3}$ part by mass to 1 part by mass with respect to 100 parts by mass of water used when hydrolyzing the silicon compound.

Where the amount of the catalyst used is $1\times10^{-3}$ parts by mass or more, the reaction proceeds sufficiently. Meanwhile, where the amount of the catalyst used is 1 part by mass or less, the concentration of impurities remaining in the fine particles becomes low, and hydrolysis becomes easy. The amount of water used is preferably from 2 mol to 15 mol with respect to 1 mol of the silicon compound. When the amount of water is 2 mol or more, the hydrolysis reaction proceeds sufficiently, and when the amount of water is 15 mol or less, the productivity is improved.

The reaction temperature is not particularly limited and the reaction may be run at normal temperature or with heating; however, the reaction is preferably run while maintaining 10° C. to 60° C. because this makes it possible to rapidly obtain the hydrolyzate and to suppress the partial condensation reaction of the hydrolyzate that is produced. 30° C. to 55° C. is more preferred and 40° C. to 50° C. is still more preferred.

The reaction time is not particularly limited and may be selected as appropriate considering the reactivity of the silicon compound(s) used, the composition of the reaction solution provided by mixing the silicon compound(s) with the acid and water, and the productivity. 1 to 60 minutes is preferred and 2 to 10 minutes is more preferred.

The pH during the hydrolysis in the first step is preferably 3.0 to 5.5 and is more preferably 3.5 to 4.5.

For the second step in the fine particle production method, the starting material solution provided by the first step is mixed with an alkaline aqueous medium and a polycondensation reaction is run on the fine particle precursor. This yields a polycondensation reaction product. The alkaline aqueous medium here is a solution provided by mixing an alkali component with water and optionally an organic solvent and so forth.

The alkali component used in the alkaline aqueous medium is one for which the aqueous solution thereof exhibits basicity, and that acts as a neutralizing agent for the catalyst used in the first step and as a catalyst for the polycondensation reaction in the second step. The alkali component here can be exemplified by alkali metal hydroxides, such as lithium hydroxide, sodium hydroxide, and potassium hydroxide; by ammonia; and by organic amines such as monomethylamine and dimethylamine.

The amount of use of the alkali component is an amount that neutralizes the acid and that effectively acts as a catalyst of the polycondensation reaction; for example, when ammonia is used as the alkali component, selection is generally made from the range from 0.01 mass parts to 12.5 mass parts per 100 mass parts of the water+organic solvent mixture.

In the second step, the pH of the polycondensation reaction solution provided by mixing the hydrolyzate with the alkaline aqueous medium (the pH in the polycondensation reaction) is preferably 8.5 to 12.0 and more preferably 9.0 to 10.0.

In the second step, an organic solvent may be further used in addition to the alkaline component and water, in order to prepare the alkaline aqueous medium. The organic solvent is not particularly limited, so long as it is compatible with water, but an organic solvent is preferable herein that dissolves 10 g or more of water per 100 g at normal temperature and a normal pressure.

Specific examples of the organic solvent include alcohols such as methanol, ethanol, n-propanol, 2-propanol and butanol; polyhydric alcohols such as ethylene glycol, diethylene glycol, propylene glycol, glycerine, trimethylolpropane and hexanetriol; ethers such as ethylene glycol monoethyl ether, acetone, diethyl ether, tetrahydrofuran and diacetone alcohol; and amide compounds such as dimethylformamide, dimethylacetamide and N-methylpyrrolidone.

Alcohol solvents such as methanol, ethanol, 2-propanol or butanol are preferable among the organic solvents enumerated above. In terms of hydrolysis and a dehydration condensation reaction, it is more preferable to select, as the organic solvent, the same alcohol as the alcohol that is eliminated.

The further addition of silicon compound when the hydrolyzate is mixed with the alkaline aqueous medium is preferred in the second step. The silicon compound at this point preferably contains a tetrafunctional silane monomer and more preferably is a tetrafunctional silane monomer. The silicon compound at this point need not have been preliminarily hydrolyzed.

The temperature during the polycondensation reaction in the second step is not particularly limited and can be varied as appropriate in correspondence to, for example, the reactivity of the silicon compounds used. For example, 10° C. to 60° C. is preferred and 20° C. to 40° C. is more preferred. The reaction time for the polycondensation reaction is also not particularly limited and can be varied as appropriate in correspondence to, for example, the reactivity of the silicon compounds used. For example, 10 to 300 minutes is preferred, 60 to 180 minutes is more preferred, and 100 to 150 minutes is still more preferred.

This reaction is preferably followed by the further, supplementary addition of a silicon compound and the execution of a supplementary polycondensation reaction (supplementary addition step). The silicon compound at this point preferably contains a tetrafunctional silane monomer and more preferably is a tetrafunctional silane monomer.

The temperature during the polycondensation reaction in the supplementary addition step is not particularly limited and can be varied as appropriate in correspondence to, for example, the reactivity of the silicon compounds used. For example, 10° C. to 60° C. is preferred and 20° C. to 40° C. is more preferred. The reaction time for the polycondensation reaction is also not particularly limited and can be varied as appropriate in correspondence to, for example, the reactivity of the silicon compounds used. For example, 10 to 300 minutes is preferred and 30 to 180 minutes is more preferred.

As described in the preceding, control of X, Y, and/or Y/X is facilitated by the stagewise addition of tetrafunctional silane monomer and execution of a polycondensation reaction. In particular, having the relationship Y<X be constantly satisfied in the condition A measurement range is facilitated. Bringing about the presence of a point of transition from Y<X to Y>X in the condition B measurement range is also facilitated.

In the third step, the polycondensation reaction product provided in the second step is mixed with an aqueous solution and conversion to fine particles is carried out. Water (tap water, pure water, and so forth) can be advantageously used as the aqueous solution, but a water-miscible component, e.g., a salt, acid, alkali, organic solvent, surfactant, water-soluble polymer, and so forth, may also be added to the water.

The temperature of the polycondensation reaction solution and the aqueous solution during mixing is not particularly limited, but the range of 5° C. to 70° C. is preferably selected considering the composition of the preceding, the productivity, and so forth. 50° C. to 65° C. is more preferred. The reaction time is also not particularly limited, and, for example, 10 to 300 minutes is preferred and 30 to 180 minutes is more preferred.

Known methods can be used without particular limitation as the fine particle recovery method. Examples are a method in which the suspended particles are scooped up, filtration methods, and so forth, and filtration methods are preferred for their operational simplicity and convenience. There are no particular limitations on the filtration method, and a known device may be selected, for example, reduced pressure filtration, centrifugal filtration, pressure filtration, and so forth. The filter paper, filter, filter fabric, and so forth used in the filtration are not particularly limited as long as acquisition on an industrial basis is possible, and may be selected as appropriate depending on the device used.

The silicon compound used can be selected as appropriate depending on the compatibility with the solvent and catalyst, or the hydrolyzability and so forth. The tetrafunctional silane monomer that forms the structure with formula (a) can be exemplified by tetramethoxysilane, tetraethoxysilane, tetraisocyanatosilane, and so forth.

Tetraethoxysilane is preferred among the preceding.

The trifunctional silane monomer that forms the structure with formula (b) can be exemplified by methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, methyldiethoxyhydroxysilane, ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, hexyltrihydroxysilane, phenyltrimethoxysilane, phenyltriethoxysilane, phenyltrichlorosilane, phenyltriacetoxysilane, and phenyltrihydroxysilane.

Methyltrimethoxysilane is preferred among the preceding.

The difunctional silane monomer that forms the structure with formula (c) can be exemplified by di-tert-butyldichlorosilane, di-tert-butyldimethoxysilane, di-tert-butyldiethoxysilane, dibutyldichlorosilane, dibutyldimethoxysilane, dibutyldiethoxysilane, dichlorodecylmethylsilane, dimethoxydecylmethylsilane, diethoxydecylmethylsilane, dichlorodimethylsilane, dimethyldimethoxysilane, diethoxydimethylsilane, and diethyldimethoxysilane.

Dimethyldimethoxysilane is preferred among the preceding.

The monofunctional silane monomer that forms the structure with formula (d) can be exemplified by t-butyldimethylchlorosilane, t-butyldimethylmethoxysilane, t-butyldimethylethoxy silane, t-butyldiphenylchlorosilane, t-butyldiphenylmethoxysilane, t-butyldiphenylethoxysilane, chlorodimethylphenylsilane, methoxydimethylphenylsilane, ethoxydimethylphenylsilane, chlorotrimethylsilane, trimethylmethoxysilane, ethoxytrimethylsilane, triethylmethoxysilane, triethylethoxysilane, tripropylmethoxysilane, tributylmethoxysilane, tripentylmethoxysilane, triphenylchlorosilane, triphenylmethoxysilane, and triphenylethoxysilane.

The number-average primary particle diameter of the fine particle is 0.05 to 0.30 μm. Having the number-average primary particle diameter be in the indicated range makes it possible to uniformly coat the fine particle, when it is used as an external additive, on the toner particle. In addition, the charge-stabilizing effect is readily obtained because stresses on the toner can be suppressed.

The stresses on the toner become large when the number-average primary particle diameter of the fine particle is less than 0.05 μm and a low print density image is output in large amounts over an extended period of time; embedding of the external additive particle in the toner surface is then facilitated. In addition, the fine particles liberated from the toner surface are small, which facilitates pass through at the cleaning site, thus facilitating ghost production and also facilitating a reduction in the cleaning performance.

When the number-average primary particle diameter of the fine particle exceeds 0.30 μm, this can facilitate liberation of the fine particle from the toner surface. Due to this, the cleaning performance declines and ghost production is facilitated.

The number-average primary particle diameter of the fine particle can be made larger by doing the following in the hydrolysis and condensation steps: lowering the reaction temperature, shortening the reaction time, and increasing the amount of catalyst. The number-average primary particle diameter of the fine particle can be made smaller by doing the following in the hydrolysis and condensation steps: raising the reaction temperature, extending the reaction time, and reducing the amount of catalyst.

The number-average primary particle diameter of the fine particle is preferably 0.07 to 0.20 μm and more preferably 0.08 to 0.15 μm.

The proportion of the silicon atom with reference to the total of the elements is at least 20% according to fluorescent x-ray (XRF) measurement of the fine particle. The transferability and stability during durability testing are improved when the proportion of the silicon atom with reference to the total of the elements is in the indicated range. At less than 20%, the charge quantity for the fine particle is excessively reduced and due to this the appearance of the transferability-improving effect is impaired.

For example, a larger proportion of the silicon atom with reference to the total of the elements can be achieved by increasing the mixing ratio of the silane monomer that forms the structures given by (a) to (d). A smaller proportion of the silicon atom with reference to the total of the elements can be achieved, for example, by lowering the mixing ratio of the silane monomer that forms the structures given by (a) to (d). The upper limit on the proportion of the silicon atom with reference to the total of the elements is preferably equal to or less than 50% from the standpoint of the charging performance. 22% to 40% is more preferred and 25% to 30% is still more preferred.

X and Y preferably satisfy $1.2 \leq Y/X \leq 2.0$ at the end point for the condition B measurement range (the time required to erode a depth of 20 nm of the polyethylene terephthalate (PET) test specimen). By having Y/X be in the indicated range, the fine particle then has a favorable elasticity, and due to this pass through at the blade cleaning region can be even more thoroughly suppressed and the transferability after durability testing is further improved.

The value of Y/X can be controlled using the mixing ratios of the silane monomers that form the structures given by (a) to (d). For example, when it is desired to increase Y/X, the mixing ratios of the silane monomers that form the structures given by (b) to (d) are increased and the mixing ratio of the silane monomer that forms the structure given by (a) is lowered. In addition, when it is desired to lower Y/X, the mixing ratios of the silane monomers that form the structures given by (b) to (d) are lowered and the mixing ratio of the silane monomer that forms the structure given by (a) is increased.

$1.2 \leq Y/X \leq 1.8$ is more preferred and $1.4 \leq Y/X \leq 1.6$ is still more preferred.

XA (atomic %) is defined as the value of X at the time when 10 nm of the PET test specimen has been eroded in condition A. XA is preferably 40 to 80 and more preferably 50 to 70.

XB (atomic %) is defined as the value of X at the time when 20 nm of the PET test specimen has been eroded in condition B. XB is preferably 20 to 60 and more preferably 30 to 50.

YA (atomic %) is defined as the value of Y at the time when 10 nm of the PET test specimen has been eroded in condition A. YA is preferably 20 to 60 and more preferably 30 to 50.

YB (atomic %) is defined as the value of Y at the time when 20 nm of the PET test specimen has been eroded in condition B. YB is preferably 40 to 80 and more preferably 50 to 70.

The Young's modulus of the fine particle is preferably 10 to 30 GPa. By having the Young's modulus be in the indicated range, the stress can be relaxed when the toner is subjected to stress from members, e.g., a carrier, and embedding or burying of the fine particle in the toner particle surface can be better suppressed.

When the Young's modulus of the fine particle is at least 10 GPa, breakage of the fine particle itself can be suppressed when the toner is subjected to stress from members, e.g., a carrier. When the Young's modulus is not more than 30 GPa, this facilitates stress relaxation when the toner is subjected to stresses from members, e.g., a carrier, and embedding or burying of the fine particle in the toner particle surface can be better suppressed. As a consequence, alterations in the state of the toner surface are impeded and variations in the charging performance and attachment force of the toner can be better suppressed.

The Young's modulus of the fine particle can be controlled by changing the mixing ratios of the aforementioned monomers and changing the temperature, duration, pH, and type of catalyst for the hydrolysis step and condensation step. For example, when a larger Young's modulus is desired, the following procedures can be used: increasing the mixing ratio of the silane monomer that forms the structure given by the aforementioned (a) and lowering the mixing ratios of the silane monomers that form the structures given by the aforementioned (b) to (d). Also, for example, the temperature in the hydrolysis step and condensation step may be increased, the duration of the hydrolysis step and condensation step may be lengthened, and the pH in the hydrolysis step and condensation step may be increased.

When a smaller Young's modulus is desired, the following procedures can be used: lowering the mixing ratio of the silane monomer that forms the structure given by the aforementioned (a) and increasing the mixing ratios of the silane monomers that form the structures (b) to (d) given above. Also, for example, the temperature in the hydrolysis step and condensation step may be lowered, the duration of the hydrolysis step and condensation step may be shortened, and the pH in the hydrolysis step and condensation step may be lowered.

The Young's modulus of the fine particle is more preferably 13 to 20 GPa.

The surface of the fine particle preferably is subjected to a surface treatment with a hydrophobic treatment agent. That is, the fine particle is preferably a silicon polymer particle that has been subjected to a surface treatment with a hydrophobic treatment agent. There are no particular limitations on the hydrophobic treatment agent, but organosilicon compounds are preferred.

Examples here are alkylsilazane compounds such as hexamethyldisilazane; alkylalkoxysilane compounds such as diethyldiethoxysilane, trimethylmethoxysilane, methyltrimethoxysilane, and butyltrimethoxysilane; fluoroalkylsilane compounds such as trifluoropropyltrimethoxysilane; chlorosilane compounds such as dimethyldichlorosilane and trimethylchlorosilane; siloxane compounds such as octamethylcyclotetrasiloxane; silicone oils such as dimethylsilicone oil; and silicone varnishes.

Changes in the attachment force of the toner post-durability testing can be suppressed by subjecting the fine particle surface to a hydrophobic treatment. Within this sphere, the fine particle is preferably subjected to a surface treatment with at least one compound selected from the group consisting of alkylsilazane compounds, alkylalkoxysilane compounds, chlorosilane compounds, fluoroalkylsilane compounds, siloxane compounds, and silicone oils.

From the standpoint referenced in the preceding, the surface of the fine particle is more preferably treated with an alkylsilazane compound.

Viewed in terms of the charge stability in high-temperature, high-humidity environments, the hydrophobicity of the fine particle according to the methanol titration method is preferably 50 to 60 volume %. 53 to 58 volume % is more preferred.

Designating, with reference to the chart obtained by $^{29}$Si-NMR measurement of the fine particle, SA as the total peak area corresponding to silicon polymer, S4 as the peak area corresponding to the following formula (a), S3 as the peak area corresponding to the following formula (b), and S2 as the peak area corresponding to the following formula (c), SA, S2, S3, and S4 preferably satisfy the following formulas (I), (II), and (III).

$$0.30 \leq S4/SA \leq 0.80 \quad (I)$$

$$0.00 \leq S3/SA \leq 0.50 \quad (II)$$

$$0.20 \leq S2/SA \leq 0.70 \quad (III)$$

(a)

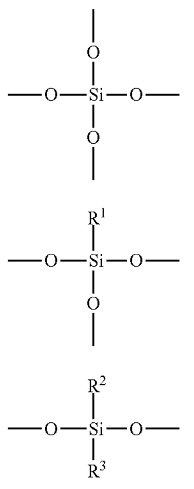

(b)

(c)

(In formulas (a) to (c), $R^1$, $R^2$, and $R^3$ each independently represent an alkyl group having 1 to 6 carbons (preferably 1 to 3 carbons and more preferably 1 or 2 carbons).)

Within the indicated ranges, when the toner is subjected to stresses from a member such as a carrier, embedding or burying of the fine particle in the toner particle surface is better suppressed and breakage of the fine particle itself is better suppressed. $0.40 \leq S4/SA \leq 0.70$ is more preferred and $0.50 \leq S4/SA \leq 0.65$ is still more preferred.

In addition, $0.00 \leq S3/SA \leq 0.10$ is more preferred and $0.00 \leq S3/SA \leq 0.05$ is still more preferred.

Also, $0.30 \leq S2/SA \leq 0.60$ is more preferred and $0.35 \leq S2/SA \leq 0.50$ is still more preferred.

When these ranges are satisfied, the abundance of Si—R (R is, for example, an alkyl group corresponding to $R^1$ to $R^6$ in formulas (b) to (d)) in the fine particle then becomes optimal, which is more preferred from the standpoints of the cleaning performance of the toner, the charge stability of the toner, and the transferability of the toner post-durability testing. S4/SA, S3/SA, and S2/SA can be controlled through the proportions of the silicon compounds that are used.

The fine particle is preferably used as an external additive for toners. That is, an external additive for toners preferably contains this fine particle and more preferably is this fine particle. In addition, the toner preferably contains a toner particle and an external additive for toners and the external additive for toners is preferably this fine particle.

When the fine particle is used as an external additive for toners, the fine particle content is preferably 0.1 to 20.0 mass parts per 100 mass parts of the toner particle from the standpoint of the charge stability. 0.5 to 15.0 mass parts is more preferred and 1.0 to 10.0 mass parts is still more preferred.

When a large number of low print density images are output over an extended period of time in a severe environment such as a high-temperature, high-humidity environment, the stresses applied to the toner are readily suppressed, and the effect of improving the transferability post-durability testing is more readily obtained, when the content of the external additive for toners is at least 0.1 mass parts.

In the case of extended image output, filming of the external additive particles onto a carrier or photosensitive member, as well as ghosts due to pass through of the fine particle at the cleaning blade, can be better suppressed when the fine particle content is not more than 20.0 mass parts.

The Toner Particle

The structure of the toner particle to which the herein described fine particle has been externally added is described in detail in the following.

Binder Resin

The binder resin used in the toner is not particularly limited, and for instance the following polymers can be used. For example, monopolymers of styrene and substituted styrene, such as polystyrene, poly-p-chlorostyrene and polyvinyltoluene; styrene copolymers such as styrene-p-chlorostyrene copolymer, styrene-vinyltoluene copolymer, styrene-vinylnaphthalene copolymer, styrene-acrylate ester copolymers, styrene-methacrylate ester copolymers, styrene-α-chloromethyl methacrylate copolymer, styrene-acrylonitrile copolymer, styrene-vinyl methyl ether copolymer, styrene-vinyl ethyl ether copolymer, styrene-vinyl methyl ketone copolymer and styrene-acrylonitrile-indene copolymer; and polyvinyl chloride, phenol resin, natural resin-modified phenol resin, natural resin-modified maleic acid resin, acrylic resin, methacrylic resin, polyvinyl acetate, silicone resin, polyester resin, polyurethane resin, polyamide resin, furan resin, epoxy resin, xylene resin, polyvinylbutyral resin, terpene resin, coumarone-indene resin and petroleum-based resin may be used. Preferred among the foregoing are polyester resins, from the viewpoint of durability stability and charging stability.

From the standpoints of environmental stability and charge stability, the acid value of the polyester resin is preferably 0.5 to 40 mg KOH/g. The functional groups in polyester resin that generate its acid value interact with the Si—R (R is, e.g., the same alkyl group as identified above) in the fine particle, and further improvements in the toner charging performance in high-temperature, high-humidity environments and in the toner durability can be brought about as a result. 1 to 20 mg KOH/g is more preferred and 1 to 15 mg KOH/g is still more preferred.

Colorant

A colorant may be used in the toner particle. The colorant may also be contained in the toner particle. The following are examples of colorants. Examples of black colorants include carbon black, and blacks obtained by color adjustment of blending yellow, magenta and cyan colorants. A pigment may be used alone as the colorant, but from the standpoint of image quality with full-color images, preferably a dye and a pigment are used together to improve the color clarity.

Examples of magenta pigments include C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C. I. Pigment Violet 19; and C. I. Vat Red 1, 2, 10, 13, 15, 23, 29 and 35.

Examples of magenta dyes include C. I. Solvent Red 1, 3, 8, 23, 24, 25, 27, 30, 49, 81, 82, 83, 84, 100, 109 and 121; C. I. Disperse Red 9; C. I. Solvent Violet 8, 13, 14, 21 and 27; oil-soluble dyes such as C. I. Disperse Violet 1; and basic dyes such as C. I. Basic Red 1, 2, 9, 12, 13, 14, 15, 17, 18, 22, 23, 24, 27, 29, 32, 34, 35, 36, 37, 38, 39 and 40 and C. I. Basic Violet 1, 3, 7, 10, 14, 15, 21, 25, 26, 27 and 28.

Examples of cyan pigments include C. I. Pigment Blue 2, 3, 15:2, 15:3, 15:4, 16 and 17; C. I. Vat Blue 6; C. I. Acid Blue 45, and copper phthalocyanine pigments having 1 to 5 phthalimidomethyl groups substituted on a phthalocyanine skeleton. Examples of cyan dyes include C. I. Solvent Blue 70.

Examples of yellow pigments include C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C. I. Vat Yellow 1, 3, and 20. Examples of yellow dyes include C. I. Solvent Yellow 162. The content of the colorant is preferably from 0.1 to 30.0 mass parts per 100 mass parts of the binder resin.

Wax

Wax may be used in the toner particle. Examples of waxes include the following. Examples of the wax include the following: hydrocarbon waxes such as low molecular weight polyethylene, low molecular weight polypropylene, alkylene copolymer, microcrystalline wax, paraffin wax and Fischer-Tropsch wax; hydrocarbon wax oxides such as polyethylene oxide wax, and block copolymers of these; waxes consisting primarily of fatty acid esters, such as carnauba wax; and partially or fully deoxidized fatty acid esters, such as deoxidized carnauba wax.

Other examples include the following: saturated linear fatty acids such as palmitic acid, stearic acid and montanic acid; unsaturated fatty acids such as brassidic acid, eleostearic acid and parinaric acid; saturated alcohols such as stearyl alcohol, aralkyl alcohol, behenyl alcohol, carnaubyl alcohol, seryl alcohol and melissyl alcohol; polyvalent alcohols such as sorbitol; esters of fatty acids such as palmitic acid, stearic acid, behenic acid and montanic acid with alcohols such as stearyl alcohol, aralkyl alcohol, behenyl alcohol, carnaubyl alcohol, seryl alcohol and mellisyl alcohol; fatty acid amides such as linoleamide, oleamide and lauramide; saturated fatty acid bisamides such as methylenebis stearamide, ethylenebis capramide, ethylenebis lauramide and hexamethylenebis stearamide; unsaturated fatty acid amides such as ethylenebis oleamide, hexamethylenebis oleamide, N,N'-dioleyladipamide and N,N'-dioleylsebacamide; aromatic bisamides such as m-xylenebis stearamide and N,N'-distearylisophthalamide; fatty acid metal salts (commonly called metal soaps) such as calcium stearate, calcium laurate, zinc stearate and magnesium stearate; aliphatic hydrocarbon waxes grafted with vinyl monomers such as styrene or acrylic acid; partially esterified products of fatty acids and polyvalent alcohols, such as behenic acid monoglyceride; and methyl ester compounds with hydroxyl groups obtained by hydrogenation of plant-based oils and fats.

The content of the wax is preferably from 2.0 parts by mass to 30.0 parts by mass, relative to 100 parts by mass of the binder resin.

Charge Control Agent

The toner particle may comprises a charge control agent as necessary. A known charge control agent may be used, but a metal compound of an aromatic carboxylic acid is especially desirable because it is colorless and yields a toner particle that has a rapid charging speed and can stably maintain a fixed charge quantity.

Examples of negatively-charging charge control agents include salicylic acid metal compounds, naphthoic acid metal compounds, dicarboxylic acid metal compounds, polymeric compounds having sulfonic acids or carboxylic acids in the side chains, polymeric compounds having sulfonic acid salts or sulfonic acid esters in the side chains, polymeric compounds having carboxylic acid salts or carboxylic acid esters in the side chains, and boron compounds, urea compounds, silicon compounds and calixarenes. The charge control agent may be added internally or externally to the toner particle.

The amount of the charge control agent added is preferably from 0.2 parts by mass to 10.0 parts by mass with respect to 100 parts by mass of the binder resin.

<Inorganic Fine Particles>

The toner may include, if necessary, other inorganic fine particles in addition to the above-mentioned fine particle. The inorganic fine particles may be internally added to the toner particle, or may be mixed with the toner particle as an external additive. When contained as an external additive, inorganic fine particles such as silica fine particles, titanium oxide fine particles, and aluminum oxide fine particles are preferable. The inorganic fine particles are preferably hydrophobized with a hydrophobizing agent such as a silane compound, a silicone oil or a mixture thereof.

As the external additive for improving the flowability, inorganic fine particles having a specific surface area of from 50 $m^2/g$ to 400 $m^2/g$ or less are preferable. Inorganic fine particles having a specific surface area in the above range may be used in combination with an external additive for toner in order to achieve both improvement in flowability and stabilization of durability.

The inorganic fine particles are preferably used in an amount of from 0.1 parts by mass to 10.0 parts by mass with respect to 100 parts by mass of the toner particle. When the above range is satisfied, the effect of stabilization of durability can be easily obtained. The content of the above-mentioned external additive for toner is preferably from 50% by mass to 100% by mass, more preferably from 80% by mass to 100% by mass, and still more preferably from 90% by mass to 100% by mass, based on the total amount of the external additive.

<Developer>

A toner can be used as a one-component developer, but it can also be mixed with a magnetic carrier and used as a two-component developer in order to further improve dot reproducibility and to supply a stable image for a long time. That is, in a two-component developer containing a toner and a magnetic carrier, the toner is preferably the above-mentioned toner.

Generally well-known substances such as, for example, iron oxide, unoxidized iron powder; metal particles such as particles of iron, lithium, calcium, magnesium, nickel, copper, zinc, cobalt, manganese, chromium, and rare earths, particles of alloys thereof, and particles of oxides thereof; a magnetic substance such as a ferrite; a magnetic substance-dispersed resin carrier (so-called resin carrier) including the magnetic substance and a binder resin that holds the magnetic substance in a dispersed state can be used as the magnetic carrier.

The mixing ratio of the magnetic carrier and the toner is preferably such that the toner concentration in the two-component developer is from 2% by mass to 15% by mass, and more preferably from 4% by mass to 13% by mass.

Method for Producing a Toner Particle and Method for Producing a Toner

The method for producing the toner particle is not particularly limited, and a known production method such as suspension polymerization, emulsification aggregation, melt-kneading or dissolution suspension can be resorted to. A toner can then be obtained by mixing the above toner external additive, and other external additives as needed, with the obtained toner particle.

Mixing of the toner particle and the external additive can be accomplished using a mixing device such as a double-cone mixer, a V-type mixer, a drum-type mixer, a super mixer, a Henschel mixer, a Nauta mixer, Mechano Hybrid (by Nippon Coke & Engineering Co., Ltd.) or Nobilta (by Hosokawa Micron Corporation).

In order to control the fixing ratio of the fine particle to the toner particle, preferably the fine particle is mixed with the toner particle and a heat treatment is performed after obtaining the toner particle mixture. That is, the toner production method preferably has a mixing step of obtaining a toner particle mixture and a heat treatment step of heat treating the toner particle mixture. The toner is preferably, for example, a heat-treated toner.

The fixing ratio of the fine particle can be improved by carrying out a heat treatment step. The fixing ratio of the fine particle to the toner particle (fine particle fixing ratio provided by a water wash method) is preferably at least 50%. When the fine particle fixing ratio is in the indicated range, even when an image is printed out in large amounts over an extended period of time, liberation of the fine particle from the toner is inhibited and the cleaning performance and post-durability testing transferability are further improved as a consequence. Moreover, even when extended printing is carried out in an environment in which the toner becomes overcharged, such as in a low-humidity environment, liberation of the fine particle from the toner is inhibited and as a consequence toner overcharging is suppressed and the transferability-improving effect is obtained to a greater degree.

This fixing ratio is more preferably at least 70%. The upper limit on the fixing ratio is not particularly limited, but is preferably equal to or less than 99%, more preferably equal to or less than 95%, and still more preferably equal to or less than 80%. The fixing ratio is preferably, for example, 50 to 99%, 70 to 90%, or 70 to 80%. The fixing ratio of the fine particle to the toner particle is easily controlled into the indicated ranges using the hot air current temperature in the heat treatment step.

For example, a hot air current-based heat treatment can be carried out using the heat treatment apparatus shown in the FIGURE.

The heat treatment apparatus has the treatment chamber 6 for heat-treating the toner particle mixture, the toner particle mixture supply means for supplying the toner particle mixture to the treatment chamber 6, the hot air supply means 7 for supplying hot air for heat treating the toner particle mixture supplied from the toner particle mixture supply means, and the collecting means 10 for discharging the heat-treated toner particles from the discharge port provided in the treatment chamber 6 to the outside of the treatment chamber 6 and collecting the discharged particles.

The heat treatment apparatus shown in the FIGURE further has a regulating means 9 as a cylindrical member, and the treatment chamber 6 has a cylindrical shape that covers the outer peripheral surface of the regulating means 9. The hot air supply means 7 is provided on one end side of the cylindrical shape of the treatment chamber 6 so that the hot air flows while rotating in the treatment chamber 6 having the cylindrical shape. Further, the toner particle supply means is composed of a plurality of supply pipes 5 provided on the outer periphery of the treatment chamber 6.

Further, the discharge port provided in the treatment chamber 6 is provided so as to be present on the outer periphery of the end portion of the treatment chamber 6 on the side opposite to the side where the hot air supply means 7 is provided, on an extension line in the rotation direction of the toner particle mixture. The heat treatment using the heat treatment apparatus having the above structure will be described below.

The toner particle mixture quantitatively supplied by the raw material quantitative supply means 1 is guided by the compressed gas adjusted by the compressed gas flow rate adjusting means 2 to the introducing tube 3 installed on the vertical line of the raw material quantitative supply means 1. The mixture that has passed through the introducing tube is uniformly dispersed by the conical protruding member 4 provided in the central portion of the raw material quantitative supply means 1, and the mixture is guided to the supply pipes 5 in eight directions spreading radially and guided to the treatment chamber 6 where the heat treatment is performed.

At this time, the flow of the mixture supplied to the treatment chamber 6 is regulated by the regulating means 9 for regulating the flow of the mixture that is provided in the treatment chamber 6. Therefore, the mixture supplied to the treatment chamber is heat-treated while swirling in the treatment chamber 6, and then cooled.

The heat for heat-treating the supplied mixture is supplied from the hot air supply means 7, distributed by the distributing member 12, and introduced while being spirally swirled in the treatment chamber 6 by the swirling member 13 for swirling the hot air. A configuration can be used in which the swirling member 13 for swirling the hot air has a plurality of blades, and the swirling of the hot air is controlled by the number and the angle thereof. The hot air is supplied from the hot air supply means outlet 11.

The heat-treated toner particles are cooled by the cold air supplied from the cold air supply means 8 (cold air supply means 8-1, 8-2 and 8-3).

Next, the cooled toner particles are collected by the collecting means 10 at the lower end of the treatment chamber. A blower (not shown) is provided at the tip of the collecting means, and the toner particles are sucked and conveyed thereby. Further, the powder particle supply port 14 is provided so that the swirling direction of the supplied mixture coincides with the swirling direction of the hot air, and the collecting means 10 of the thermal spheroidizing treatment apparatus is provided on the outer peripheral portion of the treatment chamber so as to maintain the swirling direction of the swirling powder particles. Further, the cold air supplied from the cold air supply means 8 is configured to be supplied horizontally and tangentially from the outer peripheral portion of the apparatus to the inner peripheral surface of the treatment chamber.

After obtaining the heat-treated toner particles, the heat-treated toner particles and various external additives may be mixed. Examples of suitable mixing devices include a double-cone mixer, a V-type mixer, a drum-type mixer, a super mixer, a Henschel mixer, a Nauta mixer, Mechano Hybrid (manufactured by Nippon Coke Industries Co., Ltd.), and Nobilta (manufactured by Hosokawa Micron Corporation).

The measurement methods for various physical properties will be explained below.

≤Separation of Fine Particles (External Additives for Toners) and Toner Particles from Toner>

It is also possible to measure each physical property by using the fine particle separated from the toner by using the following method. A total of 200 g of sucrose (manufactured by Kishida Chemical Co., Ltd.) is added to 100 mL of ion-exchanged water and dissolved in a hot water bath to prepare a sucrose concentrate. A total of 31 g of the sucrose concentrate and 6 mL of Contaminone N (a 10% by mass aqueous solution of a neutral detergent for cleaning precision measuring instruments; has pH 7 and includes a nonionic surfactant, an anionic surfactant, and an organic builder; manufactured by Wako Pure Chemical Industries, Ltd.) are placed in a centrifuge tube to prepare a dispersion liquid. A total of 1 g of toner is added to the dispersion liquid, and the toner lumps are loosened with a spatula or the like.

The centrifuge tube is shaken with a shaker ("KM Shaker" (model: V.SX), manufactured by Iwaki Sangyo Co., Ltd.) for 20 min under the condition of 350 reciprocations per minute. After shaking, the solution is transferred to a glass tube for a swing rotor (50 mL), and centrifugation is performed at 3500 rpm for 30 min with a centrifuge.

In the glass tube after centrifugation, the toner particle is present in the uppermost layer, and the fine particle is present on the aqueous solution side of the lower layer. The aqueous solution of the lower layer is collected and centrifuged to separate the sucrose and the fine particle, and the fine particle is collected. If necessary, centrifugation is repeated, and after sufficient separation, the dispersion liquid is dried and a fine particle is collected.

When a plurality of fine particles are added, the fine particles can be sorted by using a centrifugation method or the like.

<Method for Measuring Number-Average Particle Diameter of Primary Particles of Fine Particles>

The number-average particle diameter of primary particles of fine particle can be measured in accordance with a centrifugal sedimentation method. Specifically, 0.01 g of dried fine particles are placed in a 25 ml glass vial, and 0.2 g of a 5% Triton solution and 19.8 g of RO water are added thereto, to produce a solution. Next, the tip of the probe of an ultrasonic disperser is immersed in that solution, to elicit ultrasonic dispersion at an output of 20 W for 15 minutes, and obtain a dispersion as a result. The number-average particle diameter of primary particles is measured next, using this dispersion, with the help of a centrifugal sedimentation particle size distribution measuring device DC24000 by CPS Instruments Inc. Disc rotational speed is set to 18000 rpm, and true density is set to 1.3 g/cm$^3$. Prior to measurement, the device is calibrated using polyvinyl chloride particles having an average particle diameter of 0.476 μm.

<Method for Measuring Acid Value of Resin Such as a Binder Resin>

The acid value is the number of mg of potassium hydroxide required to neutralize acid components such as free fatty acids and resin acids contained in 1 g of a sample. The acid value is measured in the following manner according to JIS-K0070-1992.

(1) Reagent

A total of 1.0 g of phenolphthalein is dissolved in 90 mL of ethyl alcohol (95% by volume) and ion-exchanged water is added to make 100 mL and obtain a phenolphthalein solution.

A total of 7 g of special grade potassium hydroxide is dissolved in 5 mL of water and ethyl alcohol (95% by volume) is added to make 1 L. The solution is put in an alkali-resistant container so as to avoid contact with carbon dioxide, allowed to stay for 3 days, and then filtered to obtain a potassium hydroxide solution. The obtained potassium hydroxide solution is stored in an alkali-resistant container. A total of 25 mL of 0.1 mol/L hydrochloric acid is placed in a triangular flask, a few drops of the phenolphthalein solution are added, titration is performed with the potassium hydroxide solution, and a factor of the potassium hydroxide solution is obtained from the amount of the potassium hydroxide solution required for neutralization. The 0.1 mol/L hydrochloric acid used is prepared according to JIS K 8001-1998.

(2) Operation (A) Main Test

A total of 2.0 g of the crushed sample is accurately weighed into a 200 mL Erlenmeyer flask, 100 mL of a mixed solution of toluene/ethanol (2:1) is added, and dissolution is performed over 5 h. Then, a few drops of the phenolphthalein solution are added as an indicator, and titration is performed using the potassium hydroxide solution. The end point of the titration is when the light red color of the indicator continues for about 30 sec.

(B) Blank Test

The same titration as in the above operation is performed, except that no sample is used (that is, only a mixed solution of toluene/ethanol (2:1) is used).

(3) The obtained result is substituted into the following formula to calculate the acid value.

$$A=[(C-B)\times f\times 5.61]/S$$

Here, A: acid value (mg KOH/g), B: addition amount of potassium hydroxide solution in the blank test (mL), C: addition amount of potassium hydroxide solution in the main test (mL), f: potassium hydroxide solution factor, and S: mass (g) of the sample.

<Measurement of Acid Value of Polyester Resin from Toner>

The following method can be used for measuring the acid value of the polyester resin in the toner. The polyester resin is separated from the toner by the following method, and the acid value is measured. The toner is dissolved in tetrahydrofuran (THF), and the solvent is distilled off under reduced pressure from the obtained soluble fraction to obtain a tetrahydrofuran (THF)-soluble component of the toner. The obtained tetrahydrofuran (THF)-soluble component of the toner is dissolved in chloroform to prepare a sample solution having a concentration of 25 mg/ml. A total of 3.5 ml of the obtained sample solution is injected into the following apparatus, and the component with a molecular weight of 2000 or more is separated as a resin component under the following conditions.

Preparative GPC equipment: preparative HPLC LC-980 manufactured by Nippon Analytical Industry Co., Ltd.

Sorting columns: JAIGEL 3H, JAIGEL 5H (manufactured by Nippon Analytical Industry Co., Ltd.)

Eluent: chloroform

Flow velocity: 3.5 ml/min

After separating the high-molecular-weight component derived from the resin, the solvent is distilled off under reduced pressure, followed by drying in an atmosphere of 90° C. under reduced pressure for 24 h. The above operation is repeated until about 2.0 g of the resin component is obtained. Using the obtained sample, the acid value is measured according to the above procedure.

Method for Measuring the Weight-Average Particle Diameter (D4) of the Toner Particle The weight-average particle diameter (D4) of the toner particle is determined by carrying out the measurements in 25,000 channels for the number of effective measurement channels and performing analysis of the measurement data, using a "Coulter Counter Multisizer 3" (registered trademark, Beckman Coulter, Inc.), a precision particle size distribution measurement instrument operating on the pore electrical resistance method and equipped with a 100-μm aperture tube, and using the accompanying dedicated software, i.e., "Beckman Coulter Multisizer 3 Version 3.51" (Beckman Coulter, Inc.), to set the measurement conditions and analyze the measurement data.

The aqueous electrolyte solution used for the measurements is prepared by dissolving special-grade sodium chloride in deionized water to provide a concentration of approximately 1 mass % and, for example, "ISOTON II" (Beckman Coulter, Inc.) can be used. The dedicated software is configured as follows prior to measurement and analysis.

In the "modify the standard operating method (SOM)" screen in the dedicated software, the total count number in the control mode is set to 50000 particles; the number of measurements is set to 1 time; and the Kd value is set to the value obtained using "standard particle 10.0 μm" (Beckman Coulter, Inc.). The threshold value and noise level are automatically set by pressing the threshold value/noise level measurement button. In addition, the current is set to 1,600 μA; the gain is set to 2; the electrolyte solution is set to ISOTON II; and a check is entered for the post-measurement aperture tube flush. In the "setting conversion from pulses to particle diameter" screen of the dedicated software, the bin interval is set to logarithmic particle diameter; the particle diameter bin is set to 256 particle diameter bins; and the particle diameter range is set to from 2 μm to 60 μm. The specific measurement procedure is as follows.

(1) Approximately 200 mL of the above-described aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) Approximately 30 mL of the aqueous electrolyte solution is introduced into a 100-mL flatbottom glass beaker. To this is added 0.3 mL of the dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.) as a dispersing agent.

(3) A prescribed amount of deionized water is introduced into the water tank of the ultrasound disperser "Ultrasonic Dispersion System Tetora 150" (Nikkaki Bios Co., Ltd.), which has an electrical output of 120 W and is equipped with two oscillators (oscillation frequency=50 kHz) disposed such that the phases are displaced by 180°, and 2 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, 10 mg of the toner particle is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the dispersed toner-containing aqueous electrolyte solution prepared in (5) is dripped into the roundbottom beaker set in the sample stand as described in (1) with adjustment to provide a measurement concentration of 5%. Measurement is then performed until the number of measured particles reaches 50000.

(7) The measurement data is analyzed by the dedicated software provided with the instrument and the weight-average particle diameter (D4) is calculated. When set to graph/volume % with the dedicated software, the "average diameter" on the analysis/volume statistical value (arithmetic average) screen is the weight-average particle diameter (D4).

Method for Measuring the Young's Modulus of the Fine Particle

The Young's modulus of the fine particle is determined using a microcompression test using a Hysitron PI-85L PicoIndenter (Bruker).

The Young's modulus (MPa) is determined from the slope of the profile (load-displacement curve) for the displacement (nm) and test force (μN) yielded by the measurement. For measurement of the Young's modulus of the fine particle, one particle of the fine particle is measured while observing with an SEM.

Instrumentation and Tools base system: Hysitron PI-85L measurement indenter: circular flat end indenter with a diameter of 1 μm SEM used: Thermo Fisher Versa 3D SEM conditions: −10° tilt, 13 pA at 10 keV Measurement Conditions measurement mode: displacement control maximum displacement: 30 nm displacement rate: 1 nm/sec hold time: 2 seconds unloading rate: 5 nm/sec Analytic Method The Young's modulus of the fine particle is calculated by applying Hertz analysis to the curve for a 0 nm to 10 nm compression in the obtained load-displacement curve. The arithmetic average value for 100 fine particles is used.

Sample Preparation

The fine particle is attached to a silicon wafer.

Method for Measuring Fixing Ratio of the Fine Particle to Toner Particles by Washing Method Washing Step An aqueous solution of sucrose in which 20.7 g of sucrose (manufactured by Kishida Chemical Co., Ltd.) is dissolved in 10.3 g of ion-exchanged water and 6 mL of Contaminone N (a neutral detergent for cleaning precision measuring instruments which is composed of a nonionic surfactant, an anionic surfactant, and an organic builder and has a pH of 7), which is a surfactant, are placed in a 30 mL glass vial, and thoroughly mixed to prepare a dispersion liquid. As the glass vial, for example, VCV-30 manufactured by Nichiden Rika Glass Co., Ltd., outer diameter: 35 mm, height: 70 mm can be used.

A total of 1.0 g of toner is added to this dispersion liquid and allowed to stand until the toner naturally settles to prepare a pretreatment dispersion liquid. This pretreatment dispersion liquid is shaken with a shaker (YS-8D type: manufactured by Yayoi Co., Ltd.) at a shaking speed of 200 rpm for 5 min to remove the weakly adhered fine particles from the surface of the toner particles. A centrifuge is used to separate the toner in which the strongly adhered fine particles remain and the detached fine particles. The centrifuge step is performed at 3700 rpm for 30 min using a small desktop centrifuge H-19F (manufactured by Kokusan Co., Ltd.). The toner with residual fine particles is collected by suction filtration and dried to obtain toner washed with water.

Method for Measuring Fixing Ratio of Fine Particles

A method for measuring the fixing ratio of fine particles is described hereinbelow. First, the fine particles contained in the toner before the water washing treatment are quantified. The Si element intensity in the toner is measured using a wavelength dispersive fluorescent X-ray analyzer Axios advanced (manufactured by PANalytical). Next, the Si element intensity in the toner after the washing treatment is measured in the same manner. The fixing ratio (%) can be calculated by the following formula.

Fixing ratio (%)=(Intensity of Si element in toner after water washing treatment)/(Intensity of Si element in toner before water washing treatment)×100

Method for Measuring Abundance Ratio of Constituent Compounds, S3/SA, S4/SA and S2/SA of Fine Particles by Solid $^{29}$Si-NMR In solid-state $^{29}$Si-NMR, peaks are detected in shift regions that differ depending on the structure of the functional group bonded to Si of the constituent compound of the fine particles. By specifying each peak position using a standard sample, the structure bonded to Si can be specified. Further, the abundance ratio of each constituent compound can be calculated from the obtained peak area. The ratio of the peak area of the M unit structure, the D unit structure, the T unit structure, and the Q unit structure to the total peak area can be obtained by calculation.

Specifically, the measurement conditions for solid-state $^{29}$Si-NMR are as follows.

Equipment: JNM-ECX5002 (JEOL RESONANCE)

Temperature: room temperature

Measurement method: DDMAS method $^{29}$Si 45°

Sample tube: zirconia, 3.2 mm in diameter

Sample: filled in powder form in the sample tube

Sample rotation speed: 10 kHz

Relaxation delay: 180 s

Scan: 2000

After the measurement, peaks are separated for the M unit structure, D unit structure, T unit structure, and Q unit structure by curve fitting a plurality of silane components having different substituents and bonding groups of the sample, and the area of each peak is calculated.

Curve fitting is performed using EXcalibur for Windows (registered trademark) version 4.2 (EX series), which is software for JNM-EX400 manufactured by JEOL Ltd. Measurement data are read by clicking "1D Pro" from a menu icon. Next, "Curve fitting function" is selected from "Command" on a menu bar, and curve fitting is performed. Curve fitting for each component is performed so that the difference (combined peak difference) between the combined peak obtained by combining the peaks obtained by curve fitting and the peak of the measurement result is the smallest.

M unit structure: (Ra) (Rb) (Rc) $SiO_{1/2}$ (S1')

D unit structure: (Rd) (Re) $Si(O_{1/2})_2$ (S2')

T unit structure: Rf $Si(O_{1/2})_3$ (S3')

Q unit structure: $Si(O_{1/2})_4$ (S4')

SA is defined as the total peak area of these, which corresponds to the silicon polymer. That is, (S1'+S2'+S3'+S4')=SA.

The Ra, Rb, Rc, Rd, Re, and Rf in formulas (S1'), (S2'), and (S3') represent a silicon-bonded organic group, e.g., a $C_{1-6}$ hydrocarbon group (for example, an alkyl group or alkoxy group), silicon-bonded halogen atom, or silicon-bonded hydroxy group. The following are calculated from the obtained peak areas: the peak area S4, which corresponds to the structure given by formula (a); the peak area S3, which corresponds to the structure given by formula (b); and the peak area S2, which corresponds to the structure given by formula (c). When a more detailed structural confirmation is necessary, identification may be performed by combining the results of the $^{29}$Si-NMR measurement with the results from $^{13}$C-NMR measurement and $^{1}$H-NMR measurement. S3/SA, S4/SA, and S2/SA are calculated from the thusly determined SA, S2, S3, and S4.

Method for Measuring the Hydrophobicity of the Fine Particle

The hydrophobicity of the fine particle is calculated using the methanol titration method. The specific measurement procedure is as follows. A mixture is prepared by adding 0.5 g of the fine particles to 50 mL of RO water, and methanol is dripped from a burette into this mixture while stirring same until the entire amount of the fine particles is wetted. Whether the entire amount has been wetted is evaluated by whether all the fine particles floating on the water surface have sunk into the liquid and are suspended in the liquid. At this point, the hydrophobicity is taken to be the value of the percentage (volume basis) for the methanol with respect to the total amount of the added methanol and the mixture at the point of completion of the dropwise addition. A higher value for the hydrophobicity indicates a more hydrophobic character.

<Method for Measuring the Surface Treatment Agent for the Fine Particle>

The surface treatment agent for the fine particle is analyzed by pyrolysis-GC-MS (gas chromatography–mass spectrometry). Specifically, the measurement conditions are as follows.

Equipment: GC6890A (manufactured by Agilent Technologies, Inc.), pyrolyzer (manufactured by Japan Analytical Industry Co., Ltd.)

Column: HP-5 ms 30 m

Pyrolysis temperature: 590° C.

By specifying each peak position of the profile obtained by the measurement using a standard sample, the surface treatment agent for the fine particle is specified.

Method for Measuring the Proportion of the Silicon Atom in the Fine Particle Using X-ray Fluorescence (XRF)

Measurement of the proportion of the silicon atom in the fine particle is carried out in accordance with JIS K 0119-1969 and is specifically carried out as follows.

An "Axios" wavelength-dispersive x-ray fluorescence analyzer (PANalytical B. V.) is used as the measurement instrumentation, and the "SuperQ ver. 4.0F" (PANalytical B. V.) software provided with the instrument is used in order to set the measurement conditions and analyze the measurement data. Rh is used for the x-ray tube anode; a vacuum is used for the measurement atmosphere; the measurement diameter (collimator mask diameter) is 10 mm; and the measurement time is 10 seconds. Detection is performed with a proportional counter (PC) in the measurement of light elements, and is performed with a scintillation counter (SC) in the measurement of heavy elements.

Approximately 1 g of the fine particle is introduced into a specialized aluminum compaction ring and is smoothed over; using a "BRE-32" tablet compression molder (Maekawa Testing Machine Mfg. Co., Ltd.), a pellet is produced by molding to a thickness of approximately 2 mm and a diameter of approximately 20 mm by compression for 300 seconds at 20 MPa; and this pellet is used as the measurement sample.

The measurement is performed using the conditions indicated above and the elements are identified based on the positions of the resulting x-ray peaks; their concentrations are calculated from the count rate (unit: cps), which is the number of x-ray photons per unit time. The following formula is used for the calculation.

proportion [%] of the silicon atom in the fine particle=(silicon atom content [kcps] in the fine particle)/(content [kcps] of all atoms in the fine particle)×100

Method for Measuring X and Y in the Fine Particle Using XPS

The X and Y occurring in the fine particle are measured using x-ray photoelectron spectroscopy XPS. X and Y are determined by separating the peaks measured for the element silicon into a peak for the structure given by formula (a) and peaks for the structures given by formulas (b) to (d).

The measurement conditions are as follows:

instrument: PHI 5000 Versaprobe II (ULVAC-PHI, Inc.)
irradiation radiation: Ar Kα radiation
output: 25 W, 15 kV
photoelectron extraction angle: 45°
pass energy: 58.7 eV
step size: 0.125 eV
XPS peaks: C1s, O1s, Si2p
gun type: GCIB
time: 10 min
interval: 10 sec
sputter setting: 5 kV The sample is set in the 2 mmy-diameter, 2 mm-deep sample set hole machined into the XPS platen.

With regard to the measurement principle, photoelectrons are produced using an x-ray source and their energy, which is based on the characteristic chemical bonding of the material, is measured. Monochromated Ar-Kα is used as the x-ray, and the measurement is carried out using the conditions given above.

The total peak area for the silicon atom at a binding energy of 102.0 eV to 104.0 eV is defined as the total detected silicon atom peak area.

The areas are determined by dividing the total peak area for the silicon atom at a binding energy of 102.0 eV to 104.0 eV into the peak area for the structure given by formula (a) and the peak areas for the structures given by formulas (b) to (d). Y (atomic %) is defined as the sum of the proportions, in the total detected silicon atom peak area, of the peak areas at a binding energy of 102.0 eV to 103.4 eV, which correspond to silicon atoms having the structures given by formulas (b) to (d). In addition, X (atomic %) is defined as the proportion, in the total detected silicon atom peak area, of the peak area at a binding energy of 103.5 eV to 104.0 eV, which corresponds to the silicon atom having the structure given by formula (a).

The sputtering rate (rate of depth versus time) is measured in advance on a PET test specimen. The times for the PET test specimen to undergo an erosion of 2 nm, 10 nm, and 20 nm are each determined. A scanning electron microscope is used to observe the erosion depth of the PET test specimen. The following was used for the PET test specimen: a test specimen (product name: EPG100, manufacturer: Sumitomo Bakelite Co., Ltd.) with a number-average molecular weight (Mn) of 45000, a thickness of 5 mm, and a surface roughness (Ra) of 0.01 μm.

The measurement is performed using the aforementioned condition A and condition B for the conditions, and X and Y are calculated. The following are also calculated: XA, XB, YA, and YB, and Y/X at the end point for condition B.

EXAMPLES

The present invention is more specifically described in the examples provided below. However, these in no way limit the present invention. Unless specifically indicated otherwise, the "parts" in the following formulations are on a mass basis in all instances.

Fine Particle 1 Production Example

1. Hydrolysis and Condensation Polymerization Steps (1) 43.2 g RO water, 230.0 g methanol, 0.008 g acetic acid as catalyst, and 24.4 g dimethyldimethoxysilane were introduced into a 500-mL beaker, and stirring was carried out for 5 minutes at 45° C. The pH at this time was 4.0.

(2) To this was added 4.0 g of 28% aqueous ammonia and 23.2 g tetraethoxysilane, and stirring was carried out for 2.0 hours at 30° C. The pH of the polycondensation reaction solution was 9.5.

(3) To this was added 6.8 g tetraethoxysilane, and stirring was carried out for 1.0 hour at 30° C. to obtain a starting material solution.

2. Fine Particulation Step 1000 g RO water was introduced into a 2000-mL beaker, and, while stirring this at 25° C., the starting material solution yielded by the aforementioned step 1 was added dropwise over 10 minutes. The mixture was then heated to 60° C. and was held as such at 60° C. while continuing to stir without change for 1.5 hours to yield a dispersion of silicon-containing fine particles.

3. Hydrophobing Step 12.0 g hexamethyldisilazane as hydrophobic agent was added to the dispersion of silicon-containing fine particles obtained in the 2. Fine Particulation Step, and stirring was performed for 3.0 hours at 60° C. Standing at quiescence was carried out for 5 minutes; the particles that sedimented to the bottom of the solution were recovered by suction filtration; and drying under reduced pressure was carried out for 24 hours at 120° C. to yield the fine particle 1. Fine particle 1 had a number-average primary particle diameter of 0.12 μm. The properties of fine particle 1 are given in Tables 1-1 and 1-2.

Fine Particle 2 Production Example

A fine particle 2 was obtained proceeding as in the Fine Particle 1 Production Example, but changing the dimethyldimethoxysilane to 10.9 g in (1) of the 1. Hydrolysis and Condensation Polymerization Steps; in (2), changing the tetraethoxysilane to 16.3 g and adding 27.2 g trimethoxymethylsilane; and not carrying out the step of (3). The properties of the obtained fine particle 2 are given in Tables 1-1 and 1-2.

Fine Particle 3 Production Example

A fine particle 3 was obtained proceeding as in the Fine Particle 1 Production Example, but changing the dimethyldimethoxysilane to 6.3 g in (1) of the 1. Hydrolysis and Condensation Polymerization Steps; changing the tetraethoxysilane to 48.1 g in (2); and not carrying out the step of (3). The properties of the obtained fine particle 3 are given in Tables 1-1 and 1-2.

Fine Particle 4 Production Example

A fine particle 4 was obtained proceeding as in the Fine Particle 1 Production Example, but changing the stirring time in (2) of the 1. Hydrolysis and Condensation Polymerization Steps to 1.5 hours. The properties of the obtained fine particle 4 are given in Tables 1-1 and 1-2.

Fine Particle 5 Production Example

A fine particle 5 was obtained proceeding as in the Fine Particle 1 Production Example, but changing the stirring time in (2) of the 1. Hydrolysis and Condensation Polymerization Steps to 3.0 hours. The properties of the obtained fine particle 5 are given in Tables 1-1 and 1-2.

Fine Particle 6 Production Example

A fine particle 6 was obtained proceeding as in the Fine Particle 1 Production Example, but changing the stirring time in (2) of the 1. Hydrolysis and Condensation Polymerization Steps to 1.0 hour. The properties of the obtained fine particle 6 are given in Tables 1-1 and 1-2.

Fine Particle 7 Production Example

A fine particle 7 was obtained proceeding as in the Fine Particle 1 Production Example, but changing the stirring time in (2) of the 1. Hydrolysis and Condensation Polymerization Steps to 4.0 hours. The properties of the obtained fine particle 7 are given in Tables 1-1 and 1-2.

Fine Particle 8 Production Example

Fine particle 8 was obtained proceeding as in the Fine Particle 1 Production Example, but changing the hydrophobic agent used in the 3. Hydrophobing Step to octamethylcyclotetrasiloxane. The properties of the obtained fine particle 8 are given in Tables 1-1 and 1-2.

Fine Particle 9 Production Example

Fine particle 9 was obtained proceeding as in the Fine Particle 1 Production Example, but changing the hydrophobic agent used in the 3. Hydrophobing Step to chlorotrimethylsilane. The properties of the obtained fine particle 9 are given in Tables 1-1 and 1-2.

Fine Particle 10 Production Example

Fine particle 10 was obtained proceeding as in the Fine Particle 1 Production Example, but changing the hydrophobic agent used in the 3. Hydrophobing Step to trifluoropropyltrimethoxysilane. The properties of the obtained fine particle 10 are given in Tables 1-1 and 1-2.

Fine Particle 11 Production Example

Fine particle 11 was obtained proceeding as in the Fine Particle 1 Production Example, but changing the hydrophobic agent used in the 3. Hydrophobing Step to dimethylsilicone oil. The properties of the obtained fine particle 11 are given in Tables 1-1 and 1-2.

Fine Particle 12 Production Example

Fine particle 12 was obtained proceeding as in the Fine Particle 1 Production Example, but without adding a hydrophobic agent in the 3. Hydrophobing Step. The properties of the obtained fine particle 12 are given in Tables 1-1 and 1-2.

Fine Particle 13 Production Example

A fine particle 13 was obtained proceeding as in the Fine Particle 12 Production Example, but changing the dimethyldimethoxysilane to 4.2 g in (1) of the 1. Hydrolysis and Condensation Polymerization Steps; changing the tetraethoxysilane to 50.2 g in (2); and not carrying out the step of (3). The properties of the obtained fine particle 13 are given in Tables 1-1 and 1-2.

Fine Particle 14 Production Example

A fine particle 14 was obtained proceeding as in the Fine Particle 12 Production Example, but changing the 28% aqueous ammonia to 3.0 g and the stirring temperature to 45° C. in (2) of the 1. Hydrolysis and Condensation Polymerization Steps. The properties of the obtained fine particle 14 are given in Tables 1-1 and 1-2.

Fine Particle 15 Production Example

A fine particle 15 was obtained proceeding as in the Fine Particle 12 Production Example, but changing the 28% aqueous ammonia to 5.0 g and the stirring temperature to 25° C. in (2) of the 1. Hydrolysis and Condensation Polymerization Steps. The properties of the obtained fine particle 15 are given in Tables 1-1 and 1-2.

Fine Particle 16 Production Example 124.0 g ethanol, 24.0 g RO water, and 10.0 g 28% aqueous ammonia were introduced into a 2000-mL beaker; this solution was adjusted to 70° C.; and 232.0 g tetraethoxysilane and 84.0 g 5.4% aqueous ammonia were both added dropwise over 0.5 hour while stirring. After the completion of this dropwise addition, stirring was continued for an additional 0.5 hour to carry out hydrolysis, thus yielding a dispersion of particles of a siloxane bond-containing silicon polymer.

150.0 g hexamethyldisilazane was added at room temperature to the dispersion, yielded by the previous step, of particles of a siloxane bond-containing silicon polymer, followed by heating this dispersion to 50° C. to 60° C. and stirring for 3.0 hours, recovering the particulate in the dispersion by suction filtration, and drying under reduced pressure for 24 hours at 120° C. to obtain a fine particle 16. The properties of the obtained fine particle 16 are given in Tables 1-1 and 1-2.

Fine Particle 17 Production Example

A fine particle 17 was obtained proceeding as in the Fine Particle 1 Production Example, but making the following changes: in (1) of the 1. Hydrolysis and Condensation Polymerization Steps, 54.4 g trimethoxymethylsilane was added instead of the dimethyldimethoxysilane, the stirring temperature was changed to 30° C., and the stirring time was changed to 1.0 hour; in (2), the tetraethoxysilane was not added, the RO water was changed to 98.1 g, the methanol was changed to 310.7 g, the 28% aqueous ammonia was changed to 2.0 g, and the stirring time was changed to 0.5 hours; and the step of (3) was not carried out. The properties of the obtained fine particle 17 are given in Tables 1-1 and 1-2.

Fine Particle 18 Production Example

A fine particle 18 was obtained proceeding as in the Fine Particle 1 Production Example, but changing the 28% aqueous ammonia to 2.0 g and the stirring temperature to 50° C. in (2) of the 1. Hydrolysis and Condensation Polymerization Steps. The properties of the obtained fine particle 18 are given in Tables 1-1 and 1-2.

Fine Particle 19 Production Example

A fine particle 19 was obtained proceeding as in the Fine Particle 1 Production Example, but changing the 28% aqueous ammonia to 6.0 g and the stirring temperature to 20° C. in (2) of the 1. Hydrolysis and Condensation Polymerization Steps. The properties of the obtained fine particle 19 are given in Table 1-1 and Table 1-2.

Fine Particle 20 Production Example

A mixture was obtained by introducing 125 mL of DI water and 16.5 g of methacryloxypropyltrimethoxysilane into a 250-mL four-neck roundbottom flask fitted with an overhead stirring motor, a condenser, and a thermocouple. The temperature was raised to 65° C. and the mixture was stirred at 120 rpm. Nitrogen gas was bubbled through this mixture for 30 minutes. After 3 hours, 0.16 g of the radical initiator 2,2'-azobisisobutyronitrile dissolved in 10 mL ethanol was added and the temperature was raised to 75° C.

A radical polymerization was run for 5 hours, followed by the addition to the mixture of 3 mL of 1,1,1,3,3,3-hexamethyldisilazane. The reaction was run for an additional 3 hours. The final mixture was filtered through a 170-mesh sieve to remove aggregates, and the dispersion was dried overnight at 120° C. in a Pyrex dish to obtain a fine particle 20. The properties of the obtained fine particle 20 are given in Tables 1-1 and 1-2.

TABLE 1-1

| fine particle No. | particle diameter μm | silicon atom proportion % | X XA | X XB | Y YA | Y YB | Y < X for condition A measurement range | transition point for condition B | Y > X for condition B measurement range | Y/X for condition B measurement range |
|---|---|---|---|---|---|---|---|---|---|---|
| 1 | 0.12 | 28 | 60 | 40 | 40 | 60 | satisfied | present | satisfied | 1.5 |
| 2 | 0.12 | 25 | 65 | 35 | 35 | 65 | satisfied | present | satisfied | 1.9 |
| 3 | 0.12 | 29 | 80 | 20 | 20 | 80 | satisfied | present | satisfied | 4.0 |
| 4 | 0.12 | 28 | 60 | 40 | 40 | 60 | satisfied | present | satisfied | 1.5 |
| 5 | 0.12 | 28 | 60 | 40 | 40 | 60 | satisfied | present | satisfied | 1.5 |
| 6 | 0.12 | 28 | 60 | 40 | 40 | 60 | satisfied | present | satisfied | 1.5 |
| 7 | 0.12 | 28 | 60 | 40 | 40 | 60 | satisfied | present | satisfied | 1.5 |
| 8 | 0.12 | 28 | 60 | 40 | 40 | 60 | satisfied | present | satisfied | 1.5 |
| 9 | 0.12 | 28 | 60 | 40 | 40 | 60 | satisfied | present | satisfied | 1.5 |
| 10 | 0.12 | 28 | 60 | 40 | 40 | 60 | satisfied | present | satisfied | 1.5 |
| 11 | 0.12 | 28 | 60 | 40 | 40 | 60 | satisfied | present | satisfied | 1.5 |
| 12 | 0.12 | 28 | 60 | 40 | 40 | 60 | satisfied | present | satisfied | 1.5 |
| 13 | 0.12 | 30 | 82 | 18 | 18 | 82 | satisfied | present | satisfied | 4.6 |
| 14 | 0.05 | 28 | 60 | 40 | 40 | 60 | satisfied | present | satisfied | 1.5 |
| 15 | 0.30 | 28 | 60 | 40 | 40 | 60 | satisfied | present | satisfied | 1.5 |
| 16 | 0.12 | 30 | 100 | 100 | 0 | 0 | satisfied | not present | not satisfied | — |
| 17 | 0.12 | 24 | 0 | 0 | 100 | 100 | not satisfied | not present | satisfied | 4.0 |
| 18 | 0.03 | 28 | 60 | 40 | 40 | 60 | satisfied | present | satisfied | 1.5 |
| 19 | 0.32 | 28 | 60 | 40 | 40 | 60 | satisfied | present | satisfied | 1.5 |
| 20 | 0.12 | 15 | 0 | 0 | 100 | 100 | not satisfied | not present | satisfied | 4.0 |

In the table, the particle diameter refers to the number-average primary particle diameter. The proportion of the silicon atom is the proportion of the silicon atom with reference to the total of the elements in fluorescent x-ray-based measurement.

The "Y<X for condition A measurement range" indicates whether the relationship Y<X is constantly satisfied in the condition A measurement range. The transition point in the condition B measurement range refers to whether a point of transition from Y<X to Y>X is present in the condition B measurement range. The "Y>X for condition B measurement range" indicates whether Y>X is constantly satisfied after the transition (from the transition point). Y/X refers to the value at the end point in the condition B measurement range.

XA, XB, YA, and YB are as follows.

XA: the value of X at the time 10 nm of the PET test specimen has been eroded

XB: the value of X at the time 20 nm of the PET test specimen has been eroded

YA: the value of Y at the time 10 nm of the PET test specimen has been eroded

YB: the value of Y at the time 20 nm of the PET test specimen has been eroded

TABLE 1-2

| fine particle | 29Si-NMR | | | Young's modulus | hydrophobic agent in surface | hydrophobicity |
|---|---|---|---|---|---|---|
| No. | S4/SA | S3/SA | S2/SA | Gpa | treatment | % |
| 1 | 0.60 | 0.00 | 0.40 | 14 | hexamethyldisilazane | 55 |
| 2 | 0.30 | 0.50 | 0.20 | 15 | hexamethyldisilazane | 50 |
| 3 | 0.85 | 0.00 | 0.15 | 25 | hexamethyldisilazane | 62 |
| 4 | 0.60 | 0.00 | 0.40 | 10 | hexamethyldisilazane | 55 |
| 5 | 0.60 | 0.00 | 0.40 | 30 | hexamethyldisilazane | 55 |
| 6 | 0.60 | 0.00 | 0.40 | 9 | hexamethyldisilazane | 55 |
| 7 | 0.60 | 0.00 | 0.40 | 31 | hexamethyldisilazane | 55 |
| 8 | 0.60 | 0.00 | 0.40 | 14 | octamethylcyclotetrasiloxane | 45 |
| 9 | 0.60 | 0.00 | 0.40 | 14 | chlorotrimethylsilane | 45 |
| 10 | 0.60 | 0.00 | 0.40 | 14 | trifluoropropyltrimethoxysilane | 45 |
| 11 | 0.60 | 0.00 | 0.40 | 14 | dimethylsilicone oil | 45 |
| 12 | 0.60 | 0.00 | 0.40 | 14 | none | 40 |
| 13 | 0.90 | 0.00 | 0.10 | 28 | none | 25 |
| 14 | 0.60 | 0.00 | 0.40 | 14 | none | 40 |
| 15 | 0.60 | 0.00 | 0.40 | 14 | none | 40 |
| 16 | 1.00 | 0.00 | 0.00 | 70 | hexamethyldisilazane | 75 |
| 17 | 0.00 | 1.00 | 0.00 | 10 | hexamethyldisilazane | 55 |
| 18 | 0.60 | 0.00 | 0.40 | 14 | hexamethyldisilazane | 55 |
| 19 | 0.60 | 0.00 | 0.40 | 14 | hexamethyldisilazane | 55 |
| 20 | 0.00 | 0.00 | 0.00 | 40 | hexamethyldisilazane | 55 |

Polyester Resin A1 Production Example

| | |
|---|---|
| polyoxypropylene(2.2)-2,2-bis(4-hydroxyphenyl) propane | 76.9 parts (0.167 mole parts) |
| terephthalic acid (TPA) | 25.0 parts (0.145 mole parts) |
| adipic acid | 8.0 parts (0.054 mole parts) |
| titanium tetrabutoxide | 0.5 parts |

The preceding materials were introduced into a glass 4-liter four-neck flask, which was fitted with a thermometer, stirring rod, condenser, and nitrogen introduction line and placed in a mantle heater. The interior of the flask was then substituted with nitrogen gas, followed by gradually increasing the temperature while stirring and reacting for 4 hours while stirring at a temperature of 200° C. (first reaction step).

1.2 parts (0.006 mole parts) of trimellitic anhydride (TMA) was then added and a reaction was run for 1 hour at 180° C. (second reaction step) to obtain polyester resin A1, was a binder resin component. The acid value of this polyester resin A1 was 5 mg KOH/g.

Polyester Resin A2 Production Example

| | |
|---|---|
| polyoxypropylene(2.2)-2,2-bis(4-hydroxyphenyl) propane | 71.3 parts (0.155 mole parts) |
| terephthalic acid | 24.1 parts (0.145 mole parts) |
| titanium tetrabutoxide | 0.6 parts |

The preceding materials were introduced into a glass 4-liter four-neck flask, which was fitted with a thermometer, stirring rod, condenser, and nitrogen introduction line and placed in a mantle heater. The interior of the flask was then substituted with nitrogen gas, followed by gradually increasing the temperature while stirring and reacting for 2 hours while stirring at a temperature of 200° C.

5.8 parts (0.030 mole parts) of trimellitic anhydride was then added and a reaction was run for 10 hours at 180° C. to obtain polyester resin A2, which was a binder resin component. The acid value of this polyester resin A2 was 10 mg KOH/g.

Toner Particle 1 Production Example

| | |
|---|---|
| polyester resin A1 | 70.0 parts |
| polyester resin A2 | 30.0 parts |
| Fischer-Tropsch wax (peak temperature of maximum endothermic peak = 78° C.) | 5.0 parts |
| C.I. Pigment Blue 15:3 | 5.0 parts |
| aluminum 3,5-di-t-butylsalicylate compound | 0.1 parts |

The starting materials indicated in this formulation were mixed using a Henschel mixer (Model FM-75, Nippon Coke & Engineering Co., Ltd.) at a rotation rate of 20 $s^{-1}$ and a rotation time of 5 minutes, followed by kneading using a twin-screw kneader (Model PCM-30, Ikegai Corporation) set to a temperature of 125° C. and a rotation rate of 300 rpm. The resulting kneaded material was cooled and coarsely pulverized to a diameter of 1 mm and below using a hammer mill to obtain a coarsely pulverized material. The resulting coarsely pulverized material was finely pulverized using a mechanical pulverizer (T-250, Freund-Turbo Corporation).

Classification was performed using a rotary classifier (200TSP, Hosokawa Micron Corporation) to yield toner particle 1. With regard to the operating conditions for the rotary classifier (200TSP, Hosokawa Micron Corporation), classification was carried out at a classification rotor rotation rate of 50.0 $s^{-1}$. The resulting toner particle 1 had a weight-average particle diameter (D4) of 5.9 μnm.

Toner 1 Production Example

| | |
|---|---|
| toner particle 1 | 100 parts |
| fine particle 1 | 6.0 parts |

Toner particle mixture 1 was obtained by mixing these materials using a Model FM-10C Henschel mixer (Mitsui Miike Chemical Engineering Machinery Co., Ltd.) at a rotation rate of 30 $s^{-1}$ for a rotation time of 10 min.

Heat Treatment Step

Using the obtained toner particle mixture 1, a heat treatment was performed using the surface treatment apparatus shown in the FIGURE to obtain a toner 1. The properties of the toner 1 are given in Table 2. The operating conditions in the heat treatment were feed rate=2 kg/hr, hot air current temperature=150° C., hot air current flow rate=6 $m^3$/min, cold air current temperature=−5° C., cold air current flow rate=2.5 $m^3$/min, blower current rate=11 $m^3$/min, and injection air flow rate=1 $m^3$/min.

Toners 2 to 26 Production Example

Toners 2 to 26 were obtained by carrying out production proceeding as in the Toner 1 Production Example, but changing the following as indicated in Table 2: the toner particle, the fine particle, the presence/absence of execution of the hot air current treatment step, and the temperature of the hot air current in the heat treatment step. The properties of toners 2 to 26 are given in Table 2.

TABLE 2

| | | fine particle | | presence/ absence of | hot air | |
|---|---|---|---|---|---|---|
| toner No. | toner particle No. | fine particle No. | amount of addition (parts) | execution of the heat treatment step | current temperature (° C.) | fixing ratio (%) |
| 1 | 1 | 1 | 6.0 | present | 150 | 75 |
| 2 | 1 | 1 | 6.0 | present | 125 | 55 |
| 3 | 1 | 1 | 6.0 | absent | — | 45 |
| 4 | 1 | 1 | 0.2 | absent | — | 45 |
| 5 | 1 | 1 | 18.0 | absent | — | 45 |
| 6 | 1 | 1 | 21.0 | absent | — | 45 |
| 7 | 1 | 1 | 0.05 | absent | — | 45 |
| 8 | 1 | 2 | 6.0 | absent | — | 45 |
| 9 | 1 | 3 | 6.0 | absent | — | 48 |
| 10 | 1 | 4 | 6.0 | absent | — | 45 |
| 11 | 1 | 5 | 6.0 | absent | — | 45 |
| 12 | 1 | 6 | 6.0 | absent | — | 45 |
| 13 | 1 | 7 | 6.0 | absent | — | 45 |
| 14 | 1 | 8 | 6.0 | absent | — | 45 |
| 15 | 1 | 9 | 6.0 | absent | — | 45 |
| 16 | 1 | 10 | 6.0 | absent | — | 45 |

TABLE 2-continued

| | | fine particle | | presence/ absence of | hot air | |
|---|---|---|---|---|---|---|
| toner No. | toner particle No. | fine particle No. | amount of addition (parts) | execution of the heat treatment step | current temperature (° C.) | fixing ratio (%) |
| 17 | 1 | 11 | 6.0 | absent | — | 45 |
| 18 | 1 | 12 | 6.0 | absent | — | 45 |
| 19 | 1 | 13 | 6.0 | absent | — | 48 |
| 20 | 1 | 14 | 6.0 | absent | — | 45 |
| 21 | 1 | 15 | 6.0 | absent | — | 45 |
| 22 | 1 | 16 | 6.0 | absent | — | 55 |
| 23 | 1 | 17 | 6.0 | absent | — | 45 |
| 24 | 1 | 18 | 6.0 | absent | — | 45 |
| 25 | 1 | 19 | 6.0 | absent | — | 45 |
| 26 | 1 | 20 | 6.0 | absent | — | 45 |

Carrier 1 Production Example magnetite 1, having a number-average particle diameter of 0.30 μm (65 $Am^2$/kg intensity of magnetization in a 1000/4π (kA/m) magnetic field)

magnetite 2, having a number-average particle diameter of 0.50 μm (65 $Am^2$/kg intensity of magnetization in a 1000/4π (kA/m) magnetic field)

4.0 parts of a silane compound (3-(2-aminoethylamino-propyl)trimethoxysilane) was added to 100 parts of each of these materials, and each of these fine particles was treated by high-speed stirring in a vessel at ≥100° C.

phenol: 10 mass % formaldehyde solution: 6 mass %

(40 mass % formaldehyde, 10 mass % methanol, 50 mass % water)

above-described silane compound-treated magnetite 1: 58 mass % above-described silane compound-treated magnetite 2: 26 mass %

These materials, 5 parts 28 mass % aqueous ammonia, and 20 parts water were introduced into a flask, the temperature was raised to 85° C. in 30 minutes while mixing, and, while holding this, a polymerization reaction was carried out for 3 hours and the produced phenolic resin was cured. The cured phenolic resin was then cooled to 30° C., additional water was added, the supernatant was subsequently removed, and the precipitation was washed with water and then dried. This was followed by drying under reduced pressure (at or below 5 mmHg) at a temperature of 60° C. to obtain a magnetic body-dispersed spherical carrier 1. The 50% particle diameter on a volume basis (D50) was 34.2 μm.

Two-Component Developer 1 Production Example 8.0 parts of toner 1 was added to 92.0 parts of carrier 1 and a two-component developer 1 was obtained by mixing with a V-mixer (V-20, Seishin Enterprise Co., Ltd.).

Two-Component Developers 2 to 26 Production Example

Two-component developers 2 to 26 were obtained by carrying out production proceeding as in the Two-Component Developer 1 Production Example, but changing the toner as indicated in Table 3.

TABLE 3

| two-component developer No. | toner No. | carrier No. |
|---|---|---|
| 1 | 1 | 1 |
| 2 | 2 | 1 |
| 3 | 3 | 1 |
| 4 | 4 | 1 |
| 5 | 5 | 1 |
| 6 | 6 | 1 |
| 7 | 7 | 1 |
| 8 | 8 | 1 |
| 9 | 9 | 1 |
| 10 | 10 | 1 |
| 11 | 11 | 1 |
| 12 | 12 | 1 |
| 13 | 13 | 1 |
| 14 | 14 | 1 |
| 15 | 15 | 1 |
| 16 | 16 | 1 |
| 17 | 17 | 1 |
| 18 | 18 | 1 |
| 19 | 19 | 1 |
| 20 | 20 | 1 |
| 21 | 21 | 1 |
| 22 | 22 | 1 |
| 23 | 23 | 1 |
| 24 | 24 | 1 |
| 25 | 25 | 1 |
| 26 | 26 | 1 |

Example 1

Toner Evaluation Methods

A modified imagePRESS C800, a full-color copier from Canon, Inc., was used as the image-forming apparatus, and the two-component developer 1 was introduced into the developing device at the cyan station. The apparatus was modified as follows: the fixation temperature, process speed, direct-current voltage VDC of the developer carrying member, charging voltage VD of the electrostatic latent image bearing member, and laser power were altered so as to be freely settable. In the image output evaluations, an FFh image (solid image) with the desired image ratio was output; the VDC, VD, and laser power were adjusted to provide the desired toner laid-on level on the paper for the FFh image; and the evaluations described below were performed.

FFh is a value that represents 256 gradations in hexadecimal format, with 00 h being the 1st gradation (white background region) of the 256 gradations and FFh being the 256th gradation (solid region) of the 256 gradations. The evaluations were carried out based on the evaluation methods described below, and the results are given in Table 4.

(1) Method for Evaluating Ghosts that Originate with the External Additive

In order to isolate sleeve ghosts from ghosts produced originating from the external additive, the following evaluation considering external additive attachment to the photosensitive member was performed.

The obtained developer was used in the modified imagePRESS C800 full-color copier from Canon, Inc., which was modified by removal of the fixing apparatus and modified to enable a same-as-normal operation up to the development step. Adjustment was also made to provide 0.5 mg/cm$^2$ for the amount of toner in a band region on the photosensitive member (a band region of a ghost evaluation pattern, described below), and an electrostatic latent image was formed on the surface of the photosensitive member in a normal-temperature, low-humidity environment (23° C., 5% RH).

An electrostatic latent image corresponding to a halftone image (1200 dpi, pattern in which 1 line is formed by 2 dots/4 spaces) of a ghost evaluation pattern (image composed of 3 thin bands and 1 thick band) was formed on the surface of the photosensitive member.

Then, in the development step, the rotation of the photosensitive member was stopped at the point where the toner had traversed from the developing sleeve to the photosensitive member and the toner of the band region resided on the photosensitive member. The photosensitive member was detached and the toner of the band region was removed; the "amount of external additive adhered to the band region" and the "amount of external additive adhered to the solid white region", detached from the toner and residing on the photosensitive member, were measured; the difference between the band region and solid white region was determined using the following formula; and ranks were assigned according to the evaluation criteria given below.

S: amount of external additive for toner on the developing sleeve

Sb: amount of external additive adhered to band region

Sw: amount of external additive adhered to solid white region difference between band region and solid white region: ((Sb/S)−(Sw/S))×100

For the amount of external additive adhered in the band region and the amount of external additive adhered in the solid white region, a sample for observation was cut out of the photosensitive member; the external additive on the surface of the photosensitive member was observed using the electron microscope indicated below; and the amount of external additive adhered per unit area was provided by binarizing the external additive versus outside the external additive by image processing. electron microscope: Hitachi S-4800 ultrahigh resolution field emission scanning electron microscope (Hitachi High-Technologies Corporation).

The evaluation criteria are as follows. A score of C or better was regarded as excellent. The results of the evaluations are given in Table 4.

A: the difference between the band region and solid white region was less than 0.03%

B: the difference between the band region and solid white region was at least 0.03%, but less than 0.07%

C: the difference between the band region and solid white region was at least 0.07%, but less than 0.15%

D: the difference between the band region and solid white region was 0.15% or more (2) Method for Evaluating the Cleaning Performance in a normal-temperature, low-humidity environment (23° C., 5% RH) amount of discharge current in primary charging process: 120 μA cleaning blade setting angle: 20° cleaning blade holding method: swinging mode contact pressure by cleaning blade against photosensitive drum: 25 N/m solid laid-on level on photosensitive drum: 0.3 to 0.4 mg/cm$^2$ 1000 prints were made under these conditions of an A4 horizontal band chart having a print percentage of 10%. The process speed was then set to 260 mm/sec; toner equivalent to ten A3 solid prints was supplied to the cleaning section; and the rotation of the photosensitive member was immediately stopped at the time at which the toner was held back by the cleaning blade. Tape was applied to the surface of the photosensitive member downstream from the cleaning blade contact region to recover the passed-through toner, and the reflection density was measured, using a spectrodensitometer (500 Series, X-Rite, Incorporated), on the tape to which the toner was adhered.

The evaluation was carried out using the following evaluation criteria based on the obtained reflection density. A score of C or better was regarded as excellent. The results of the evaluations are given in Table 4.

A: less than 0.010

B: equal to or greater than 0.010, but less than 0.015

C: equal to or greater than 0.015, but less than 0.020

D: equal to or greater than 0.020

(3) Method for Evaluating the Transferability Post-Durability Testing

A 100000-print image output durability test (1% print percentage image) was run in a normal-temperature, low-humidity environment (23° C., 5% RH), followed by the output of a solid image. The untransferred toner on the photosensitive member (photosensitive drum) at the time of solid image formation was taped and stripped off using transparent polyester adhesive tape.

The stripped-off adhesive tape was pasted on paper and the density of this was measured using a spectrodensitometer (500 Series, X-Rite, Incorporated). In addition, the adhesive tape was pasted by itself on paper and the density of this was also measured. The density difference Δ was calculated by subtracting the latter density value from the former density value, and this density difference Δ was evaluated based on the evaluation criteria given below.

During the continuous image output of the 100000 prints, image output was carried out using the same developing conditions and transfer conditions as for the first print (no calibration). CS-680 general-purpose copy paper (A4 paper, areal weight: 68 $g/m^2$, sold by Canon Marketing Japan Inc.) was used for the transfer material for the evaluation in the 100000-print image output durability test. Multi-Purpose Paper copy paper, commonly referred to as voice paper (A4 paper, areal weight: 75 $g/m^2$, sold by Canon U.S.A., Inc.), was used for the solid image after the output test.

The evaluation criteria are as follows. A score of D or better was regarded as excellent. The results of the evaluations are given in Table 4.

(Evaluation criteria, density difference Δ)

A: less than 0.02

B: equal to or greater than 0.02, but less than 0.05

C: equal to or greater than 0.05, but less than 0.10

D: equal to or greater than 0.10, but less than 0.15

E: equal to or greater than 0.15

Examples 2 to 21

The same evaluations as in Example 1 were carried out on each of the two-component developers 2 to 21. The results of the evaluations for Examples 2 to 21 are given in Table 4.

Comparative Examples 1 to 4

The same evaluations as in Example 1 were carried out on each of the two-component developers 22 to 25. The results of the evaluations for Comparative Examples 1 to 4 are given in Table 4.

TABLE 4

| | two-component | ghost evaluation | | cleaning performance | | transferability post-durability testing | |
|---|---|---|---|---|---|---|---|
| | developer No. | numerical value | rank | numerical value | rank | numerical value | rank |
| Example 1 | 1 | 0.01 | A | 0.006 | A | 0.01 | A |
| Example 2 | 2 | 0.02 | A | 0.010 | B | 0.01 | A |
| Example 3 | 3 | 0.02 | A | 0.012 | B | 0.02 | B |
| Example 4 | 4 | 0.01 | A | 0.007 | A | 0.04 | B |
| Example 5 | 5 | 0.02 | A | 0.010 | B | 0.01 | A |
| Example 6 | 6 | 0.04 | B | 0.012 | B | 0.01 | A |
| Example 7 | 7 | 0.01 | A | 0.007 | A | 0.05 | C |
| Example 8 | 8 | 0.03 | B | 0.007 | A | 0.04 | B |
| Example 9 | 9 | 0.04 | B | 0.014 | B | 0.03 | B |
| Example 10 | 10 | 0.03 | B | 0.010 | B | 0.01 | A |
| Example 11 | 11 | 0.04 | B | 0.013 | B | 0.01 | A |
| Example 12 | 12 | 0.03 | B | 0.015 | C | 0.01 | A |
| Example 13 | 13 | 0.04 | B | 0.013 | B | 0.04 | B |
| Example 14 | 14 | 0.03 | B | 0.012 | B | 0.02 | B |
| Example 15 | 15 | 0.03 | B | 0.013 | B | 0.02 | B |
| Example 16 | 16 | 0.03 | B | 0.012 | B | 0.02 | B |
| Example 17 | 17 | 0.03 | B | 0.014 | B | 0.04 | B |
| Example 18 | 18 | 0.03 | B | 0.014 | B | 0.08 | C |
| Example 19 | 19 | 0.03 | B | 0.014 | B | 0.10 | D |
| Example 20 | 20 | 0.07 | C | 0.016 | C | 0.06 | C |
| Example 21 | 21 | 0.09 | C | 0.018 | C | 0.03 | B |
| Comparative Example 1 | 22 | 0.03 | B | 0.014 | B | 0.15 | E |
| Comparative Example 2 | 23 | 0.16 | D | 0.020 | D | 0.05 | C |
| Comparative Example 3 | 24 | 0.15 | D | 0.022 | D | 0.12 | D |
| Comparative Example 4 | 25 | 0.17 | D | 0.021 | D | 0.13 | D |
| Comparative Example 5 | 26 | 0.17 | D | 0.021 | D | 0.17 | E |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-129412, filed Aug. 15, 2022, which is hereby incorporated by reference herein in its entirety.

What is claimed is:

1. A fine particle, comprising:

silicon;

the fine particle having a number-average primary particle diameter of 0.05 to 0.30 μm;

the proportion of a silicon atom with reference to a total of elements being at least 20% according to fluorescent x-ray measurement of the fine particle; and with respect to the silicon atom proportions measured in analysis by x-ray photoelectron spectroscopy while irradiating with Ar-Kα radiation and etching, and using a total detected silicon atom peak area for total peak area of the silicon atom at a binding energy of 102.0 to 104.0 eV, when X is a proportion (atomic %) in the total detected silicon atom peak area of a peak area at a binding energy of 103.5 to 104.0 eV that corresponds to silicon atoms having a structure given by following (a), and Y is a sum of proportions (atomic %) in the total detected silicon atom peak area of peak areas at a binding energy of 102.0 to 103.4 eV that correspond to silicon atoms having structures given by following formula formulae (b), (c) and (d)

(a)

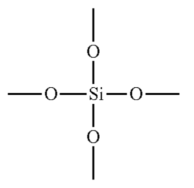

(b)

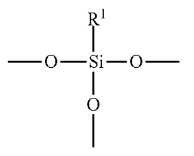

(c)

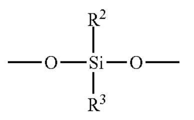

(d)

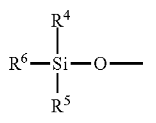

where $R^1$, $R^2$, $R^3$, $R^4$, $R^5$ and $R^6$ independently represent an alkyl group or a phenyl group (i) Y<X is constantly satisfied in Condition A measurement range, and (ii) a point of transition from Y<X to Y>X is present in Condition B measurement range and Y>X is constantly satisfied after the transition Condition A: for a polyethylene terephthalate test specimen, time for which a starting point is time required to erode a depth of 2 nm by irradiation with Ar-Kα radiation and for which an end point is time required to erode a depth of 10 nm, and Condition B: for a polyethylene terephthalate test specimen, time for which a starting point is time required to erode a depth of 10 nm by irradiation with Ar-Kα radiation and for which an end point is time required to erode a depth of 20 nm, wherein $0.30 \leq S4/SA \leq 0.80$ $0.00 \leq S3/SA \leq 0.50$ $0.20 \leq S2/SA \leq 0.70$ when in a chart obtained by $^{29}$Si-NMR measurement of the fine particle, SA is a total peak area corresponding to silicon polymer, S4 is a peak area corresponding to formula (a), S3 is a peak area corresponding to formula (b), and S2 is a peak area corresponding to formula (c) where $R^1$, $R^2$ and $R^3$ independently represent an alkyl group having 1 to 6 carbons.

2. The fine particle according to claim 1, wherein X and Y at the end point in the condition B measurement range satisfy $1.2 \leq Y/X \leq 2.0$.

3. The fine particle according to claim 1, wherein the fine particle is surface-treated with at least one compound selected from the group consisting of alkylsilazane compounds, alkylalkoxysilane compounds, chlorosilane compounds, fluoroalkylsilane compounds, siloxane compounds, and silicone oils.

4. The fine particle according to claim 1, wherein the fine particle has a Young's modulus of 10 to 30 GPa.

5. The fine particle according to claim 1, wherein the fine particle has a hydrophobicity of 50 to 60 volume % measured by the methanol titration method.

6. An external additive for toner, comprising:

a fine particle comprising silicon;

the fine particle having a number-average primary particle diameter of 0.05 to 0.30 μm;

the proportion of a silicon atom with reference to a total of elements being at least 20% according to fluorescent x-ray measurement of the fine particle; and with respect to the silicon atom proportions measured in analysis by x-ray photoelectron spectroscopy while irradiating with Ar-Kα radiation and etching, and using a total detected silicon atom peak area for total peak area of the silicon atom at a binding energy of 102.0 to 104.0 eV, when X is a proportion (atomic %) in the total detected silicon atom peak area of a peak area at a binding energy of 103.5 to 104.0 eV that corresponds to silicon atoms having a structure given by following (a), and Y is a sum of proportions (atomic %) in the total detected silicon atom peak area of peak areas at a binding energy of 102.0 to 103.4 eV that correspond to silicon atoms having structures given by following formula formulae (b), (c) and (d)

(a)

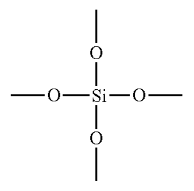

-continued (b)

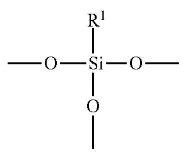

(c)

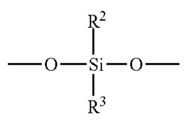

(d)

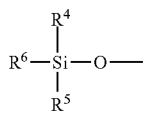

where $R^1$, $R^2$, $R^3$, $R^4$, $R^5$ and $R^6$ independently represent an alkyl group or a phenyl group (i) Y<X is constantly satisfied in Condition A measurement range described below, and (ii) a point of transition from Y<X to Y>X is present in Condition B measurement range and Y>X is constantly satisfied after the transition Condition A: for a polyethylene terephthalate test specimen, time for which a starting point is time required to erode a depth of 2 nm by irradiation with Ar-Kα radiation and for which an end point is time required to erode a depth of 10 nm, and Condition B: for a polyethylene terephthalate test specimen, time for which a starting point is time required to erode a depth of 10 nm by irradiation with Ar-Kα radiation and for which an end point is time required to erode a depth of 20 nm., wherein $0.30 \leq S4/SA \leq 0.80$ $0.00 \leq S3/SA \leq 0.50$ $0.20 \leq S2/SA \leq 0.70$ when in a chart obtained by $^{29}$Si-NMR measurement of the fine particle, SA is a total peak area corresponding to silicon polymer, S4 is a peak area corresponding to formula (a), S3 is a peak area corresponding to formula (b), and S2 is a peak area corresponding to formula (c) where $R^1$, $R^2$ and $R^3$ independently represent an alkyl group having 1 to 6 carbons.

7. A toner, comprising:

a toner particle; and a fine particle comprising silicon;

the fine particle having a number-average primary particle diameter of 0.05 to 0.30 μm;

the proportion of a silicon atom with reference to a total of elements being at least 20% according to fluorescent x-ray measurement of the fine particle; and with respect to the silicon atom proportions measured in analysis by x-ray photoelectron spectroscopy while irradiating with Ar-Kα radiation and etching, and using a total detected silicon atom peak area for total peak area of the silicon atom at a binding energy of 102.0 to 104.0 eV, when X is a proportion (atomic %) in the total detected silicon atom peak area of a peak area at a binding energy of 103.5 to 104.0 eV that corresponds to silicon atoms having a structure given by following (a), and Y is a sum of proportions (atomic %) in the total detected silicon atom peak area of peak areas at a binding energy of 102.0 to 103.4 eV that correspond to silicon atoms having structures given by following formula formulae (b), (c) and (d)

(a)

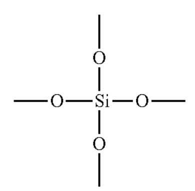

(b)

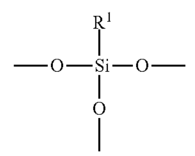

(c)

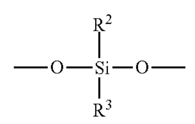

(d)

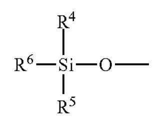

where $R^1$, $R^2$, $R^3$, $R^4$, $R^5$ and $R^6$ independently represent an alkyl group or a phenyl group (i) Y<X is constantly satisfied in Condition A measurement range described below, and (ii) a point of transition from Y<X to Y>X is present in Condition B measurement range and Y>X is constantly satisfied after the transition Condition A: for a polyethylene terephthalate test specimen, time for which a starting point is time required to erode a depth of 2 nm by irradiation with Ar-Kα radiation and for which an end point is time required to erode a depth of 10 nm, and Condition B: for a polyethylene terephthalate test specimen, time for which a starting point is time required to erode a depth of 10 nm by irradiation with Ar-Kα radiation and for which an end point is time required to erode a depth of 20 nm, wherein $0.30 \leq S4/SA \leq 0.80$ $0.00 \leq S3/SA \leq 0.50$ $0.20 \leq S2/SA \leq 0.70$ when in a chart obtained by $^{29}$Si-NMR measurement of the fine particle, SA is a total peak area corresponding to silicon polymer, S4 is a peak area corresponding to formula (a), S3 is a peak area corresponding to formula (b), and S2 is a peak area corresponding to formula (c) where $R^1$, $R^2$ and $R^3$ independently represent an alkyl group having 1 to 6 carbons.

8. The toner according to claim 7, wherein a content of the fine particle is 0.1 to 20.0 mass parts per 100 mass parts of the toner particle.

9. The toner according to claim 7, wherein the fixing ratio of the fine particle on the toner particle is at least 50%.

* * * * *